US011024928B2

(12) United States Patent
Kato et al.

(10) Patent No.: US 11,024,928 B2
(45) Date of Patent: Jun. 1, 2021

(54) BATTERY TERMINAL

(71) Applicant: YAZAKI CORPORATION, Tokyo (JP)

(72) Inventors: Takayuki Kato, Shizuoka (JP); Takahiro Shiohama, Shizuoka (JP); Takashi Yoshida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/892,217

(22) Filed: Jun. 3, 2020

(65) Prior Publication Data
US 2020/0303715 A1 Sep. 24, 2020

Related U.S. Application Data

(62) Division of application No. 14/932,264, filed on Nov. 4, 2015, now Pat. No. 10,714,733.

(30) Foreign Application Priority Data

Nov. 4, 2014 (JP) ................................. 2014-224556
Feb. 12, 2015 (JP) ................................. 2015-025635

(51) Int. Cl.
*H01M 50/543* (2021.01)
*H01R 11/28* (2006.01)
*H01M 50/50* (2021.01)
*H01M 50/552* (2021.01)

(52) U.S. Cl.
CPC ......... *H01M 50/543* (2021.01); *H01M 50/50* (2021.01); *H01M 50/561* (2021.01); *H01R 11/283* (2013.01); *H01M 2220/20* (2013.01)

(58) Field of Classification Search
CPC ..... H01M 2/305; H01M 2/307; H01M 2/1294
See application file for complete search history.

(56) References Cited

FOREIGN PATENT DOCUMENTS

| CN | 202189857 U | 4/2012 |
|----|-------------|--------|
| CN | 202712324 U | 1/2013 |
| CN | 103311492 A | 9/2013 |
| JP | 9-245767 A | 9/1997 |
| JP | 2002-184387 A | 6/2002 |
| JP | 2003-151651 A | 5/2003 |
| JP | 2003-187783 A | 7/2003 |
| JP | 2003-187784 A | 7/2003 |
| JP | 2004-186096 A | 7/2004 |

OTHER PUBLICATIONS

Chinese Office Action for the related Chinese Patent Application No. 201510740500.3 dated May 24, 2018.
Chinese Office Action for the related Chinese Patent Application No. 201510740500.3 dated Oct. 10, 2017.

*Primary Examiner* — Ladan Mohaddes
(74) *Attorney, Agent, or Firm* — Kenealy Vaidya LLP

(57) ABSTRACT

A battery terminal includes a penetration plate arranged to penetrate from one end portions of annular portions to the other end portions interposing slits, a fastening bolt supported to be rotatable around an axial direction by a threaded hole provided on the other end portion of the penetration plate, and a spacer arranged in contact with the annular portions from the other end portion side of the penetration plate and converting a tightening force in the axial direction arising along with the rotation of the fastening bolt around the axial direction into a pressing force that presses the annular portions from a long-side direction. The penetration plate is arranged to penetrate a clearance of the pair of annular portions. The pair of annular portions includes projecting portions as a clearance reduction portion that reduces the clearance in at least a part of the penetration area of the penetration plate.

8 Claims, 10 Drawing Sheets

BATTERY TERMINAL

CROSS-REFERENCE TO RELATED APPLICATION(S)

This application is a Divisional application and claims priority under 35 U.S.C. § 120 to U.S. application Ser. No. 14/932,264 filed on Nov. 4, 2015, which in turn claims priority under 35 U.S.C. § 119 to Japanese Patent Application No. 2014-224556 filed in Japan on Nov. 4, 2014 and Japanese Patent Application No. 2015-025635 filed in Japan on Feb. 12, 2015, which are all incorporated by reference in their entireties.

BACKGROUND OF THE INVENTION

1. Field of the Invention

The present invention relates to a battery terminal.

2. Description of the Related Art

Conventionally, a battery terminal to be mounted on a battery post that is provided to stand on a battery installed in a vehicle and the like has been known. As a conventional battery terminal, Japanese Patent Application Laid-open No. H09-245767 discloses the configuration of a battery terminal that can be mounted on a battery post by being fastened while the battery post is inserted to a through-hole thereof, for example. As described in Japanese Patent Application Laid-open No. H09-245767, in general, the conventional battery terminal is mounted on the battery post by tightening a bolt and a nut that are arranged with the horizontal direction as an axis direction so as to reduce the diameter of the through-hole to which the battery post is inserted and ensure a fastening force to the battery post (hereinafter, this method is described as "lateral tightening method").

In such a conventional battery terminal of the lateral tightening method, it is necessary to rotate the bolt and the nut around the axis line in the horizontal direction for fastening. Consequently, when mounting the terminal on the battery post, it has been necessary to set a tool for rotating the bolt and the nut from the lateral side of the battery post, that is, the lateral side of the battery, and perform rotating operation. Hence, it has been necessary to take up a large work space to insert and operate the tool on the lateral side of the battery.

Meanwhile, in recent years, the application of an EN battery, which is being the mainstream in Europe, to automobiles has begun to be examined. In the EN (European Norm, European Standards) battery, the battery post on which the battery terminal is mounted is positioned lower than the upper surface of the battery. Thus, conceivable is a situation in which, when the conventional battery terminal of the lateral tightening method is used, the work using a fitting tool is difficult.

In addition, the conventional battery terminal disclosed in Japanese Patent Application Laid-open No. H09-245767 has room for further improving its fastening performance when fastened to the battery post.

SUMMARY OF THE INVENTION

The present invention has been made in consideration of the foregoing, and an object of the present invention is to provide a battery terminal capable of reducing the work space required in the periphery of the battery when fastened to the battery post.

Another object of the present invention is to provide a battery terminal capable of improving its fastening performance when fastened to a battery post.

According to one aspect of the present invention, a battery terminal includes an annular portion on which a post insertion hole to which a battery post is inserted and a slit that continues to the post insertion hole are formed; a penetration plate that is arranged to penetrate through from one end portion of the annular portion to another end portion of the annular portion interposing the slit along a width direction that is a direction orthogonal to an axial direction of the battery post and a direction of traversing the slit; a retaining portion that is provided on one end portion of the penetration plate and prevents the penetration plate from coming off from the annular portion; a fastening-member support portion provided on another end portion of the penetration plate; a fastening member supported to be rotatable around the axial direction by the fastening-member support portion; a fastened member that screws together with the fastening member; and a pressing-force conversion member that is arranged in contact with the annular portion from the other end portion side of the penetration plate, and converts a tightening force in the axial direction that arises between the fastening member and the fastened member along with rotation of the fastening member around the axial direction into a pressing force in the width direction that presses the annular portion in a direction of reducing an interval of the slit of the annular portion out of the width direction, wherein the annular portion is a pair of annular portions arranged to face each other along the axial direction, the penetration plate is arranged to penetrate through a clearance of the pair of annular portions, and the pair of annular portions includes a clearance reduction portion that reduces the clearance in at least a part of a penetration area of the penetration plate.

According to another aspect of the present invention, in the battery terminal, it is preferable that the clearance reduction portion includes a first projecting portion that is provided to project from one of the pair of annular portions toward the penetration plate side.

According to still another aspect of the present invention, in the battery terminal, it is preferable that the clearance reduction portion includes a second projecting portion that is provided to project from the other of the pair of annular portions toward the penetration plate side and is arranged to face the first projecting portion.

According to still another aspect of the present invention, in the battery terminal, it is preferable that the fastened member includes a threaded hole provided to run through in the axial direction at the other end portion of the penetration plate, the fastening member includes a bolt supported to be rotatable around the axial direction by the threaded hole, the fastening-member support portion includes the threaded hole, the pressing-force conversion member includes a spacer that is arranged being penetrated by the bolt between the bolt and the penetration plate and is restricted to rotate around the axial direction, the spacer includes a first tapered surface formed to come in contact with the other end portion that is an end portion of the annular portion in the width direction and is on the opposite side of the one end portion held by the retaining portion, the other end portion of the annular portion in the width direction includes a second tapered surface formed to come in contact with the first tapered surface, and the first tapered surface provided on the spacer and the second tapered surface provided on the annular portion include an inclination in a direction of converting a tightening force in the axial direction, which arises between the bolt and the threaded hole when the bolt comes closer to the threaded hole side along the axial direction along with the rotation around the axial direction, into a pressing force in the width direction in which the spacer presses the annular portion in a direction of reducing an interval of the slit of the annular portion.

According to still another aspect of the present invention, a battery terminal includes an annular portion on which a post insertion hole to which a battery post is inserted and a slit that continues to the post insertion hole are formed; a penetration plate that is arranged to penetrate through from one end portion of the annular portion to another end portion of the annular portion interposing the slit along a width direction that is a direction orthogonal to an axial direction of the battery post and a direction of traversing the slit; a retaining portion that is provided on one end portion of the penetration plate and configured to prevent the penetration plate from coming off from the annular portion; and a pressing-force applying portion that is provided on another end portion of the penetration plate and configured to apply a pressing force in the width direction that presses the annular portion in a direction of reducing an interval of the slit of the annular portion out of the width direction, wherein the penetration plate includes a pair of longitudinal side end surfaces that extends along the width direction and is arranged to face each other in a short-side direction orthogonal to the width direction and the axial direction, and includes, at least at a portion exposed from the slit in one longitudinal side end surface arranged outside of the annular portion out of the pair of longitudinal side end surfaces, a recessed portion that is formed so as to reduce a size of the penetration plate in the short-side direction to another longitudinal side end surface side.

According to still another aspect of the present invention, in the battery terminal, it is preferable that the annular portion is a pair of annular portions arranged to face each other along the axial direction, the pair of annular portions is coupled together by a bent coupling portion that extends in the axial direction at an end portion positioned at an outer edge of the slit, and the recessed portion is formed such that, when compared with a clearance between the one longitudinal side end surface of the penetration plate on which the recessed portion is provided and the bent coupling portion, a clearance between a bottom of the recessed portion and the bent coupling portion becomes wide.

According to still another aspect of the present invention, in the battery terminal, it is preferable that the pressing-force applying portion includes a fastening-member support portion provided on the other end portion of the penetration plate, a fastening member supported to be rotatable around the axial direction by the fastening-member support portion, a fastened member that screws together with the fastening member, and a pressing-force conversion member that is arranged in contact with the annular portion from the other end portion side of the penetration plate, and converts a tightening force in the axial direction that arises between the fastening member and the fastened member along with rotation of the fastening member around the axial direction into a pressing force in the width direction that presses the annular portion in a direction of reducing an interval of the slit of the annular portion out of the width direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
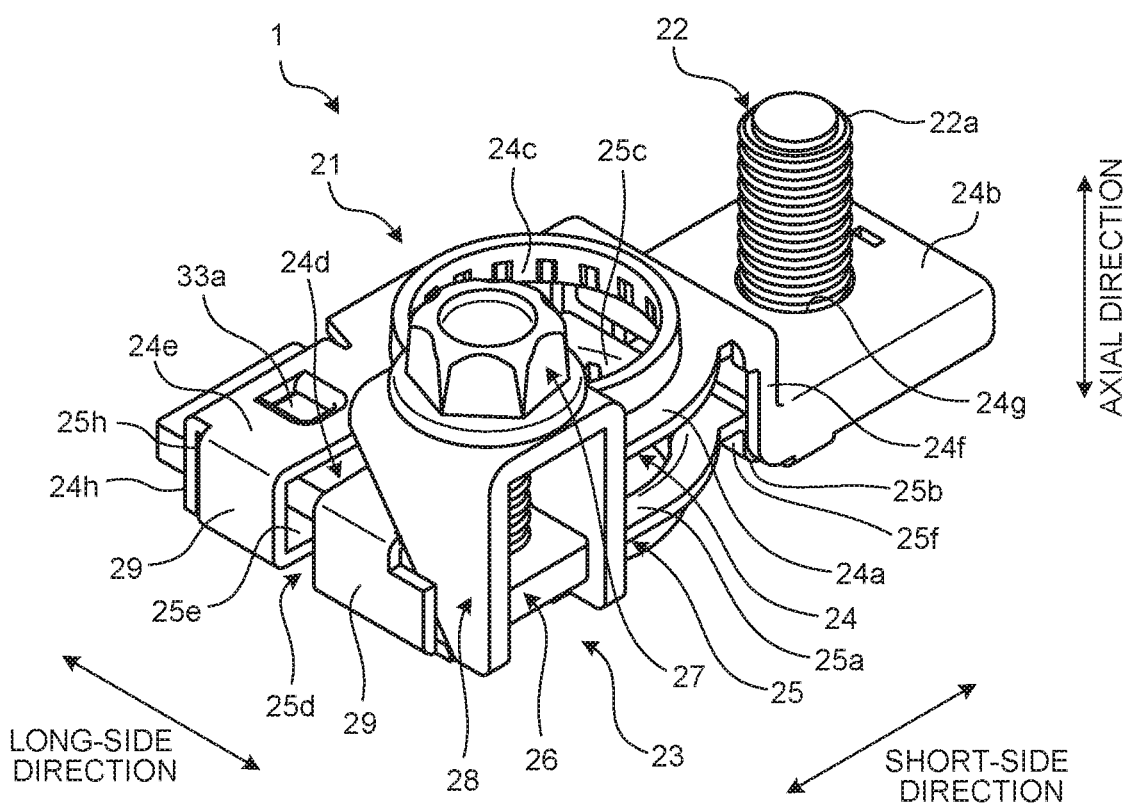
FIG. 1 is a perspective view schematically illustrating the configuration of a battery terminal according to a first embodiment of the present invention.

The following describes embodiments of a battery terminal according to the present invention based on the accompanying drawings. In the following drawings, identical or equivalent portions are given identical reference numerals and their descriptions are not repeated.

First Embodiment

Figure 2:
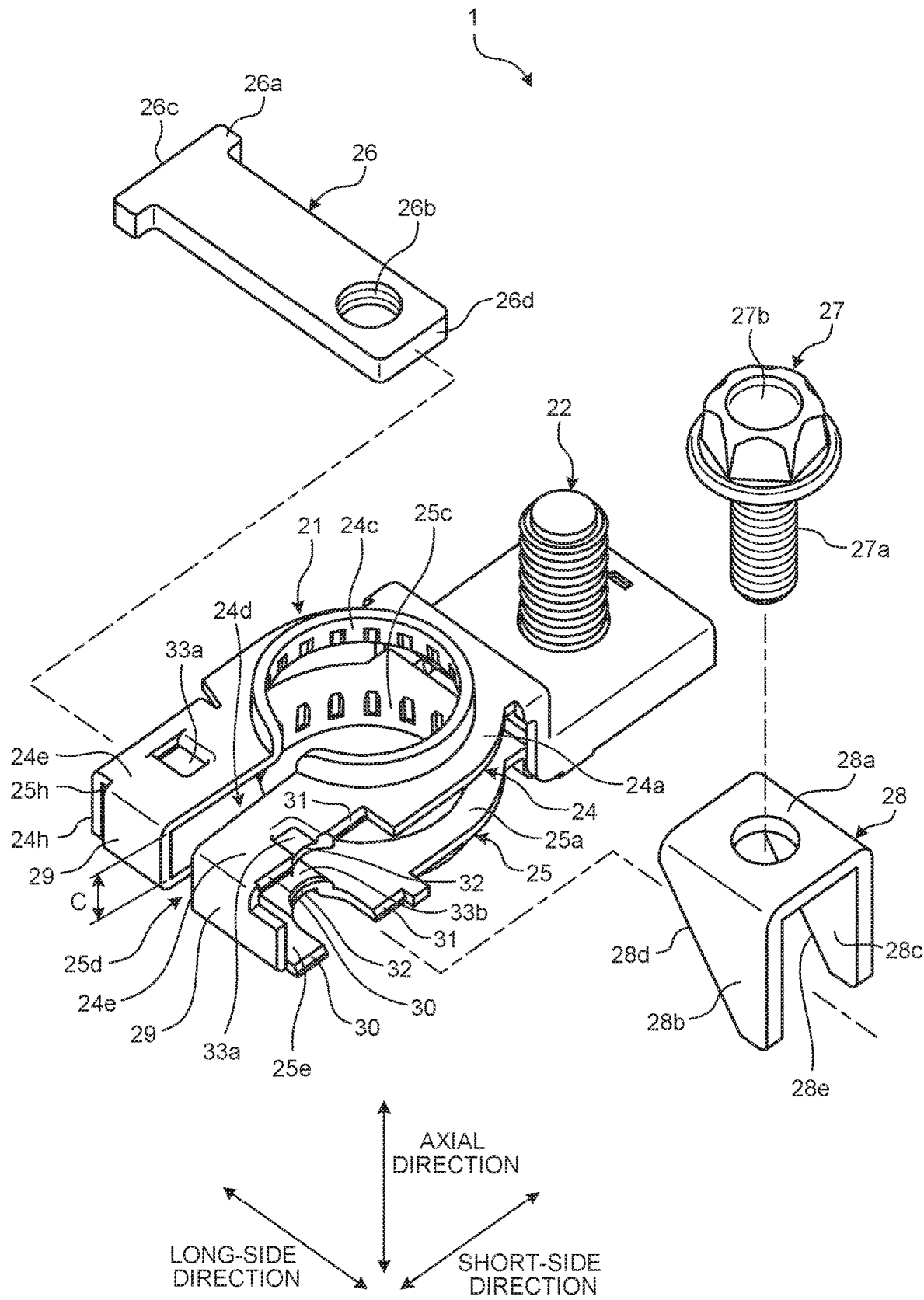
FIG. 2 is an exploded perspective view of the battery terminal illustrated in FIG. 1.
Figure 3:
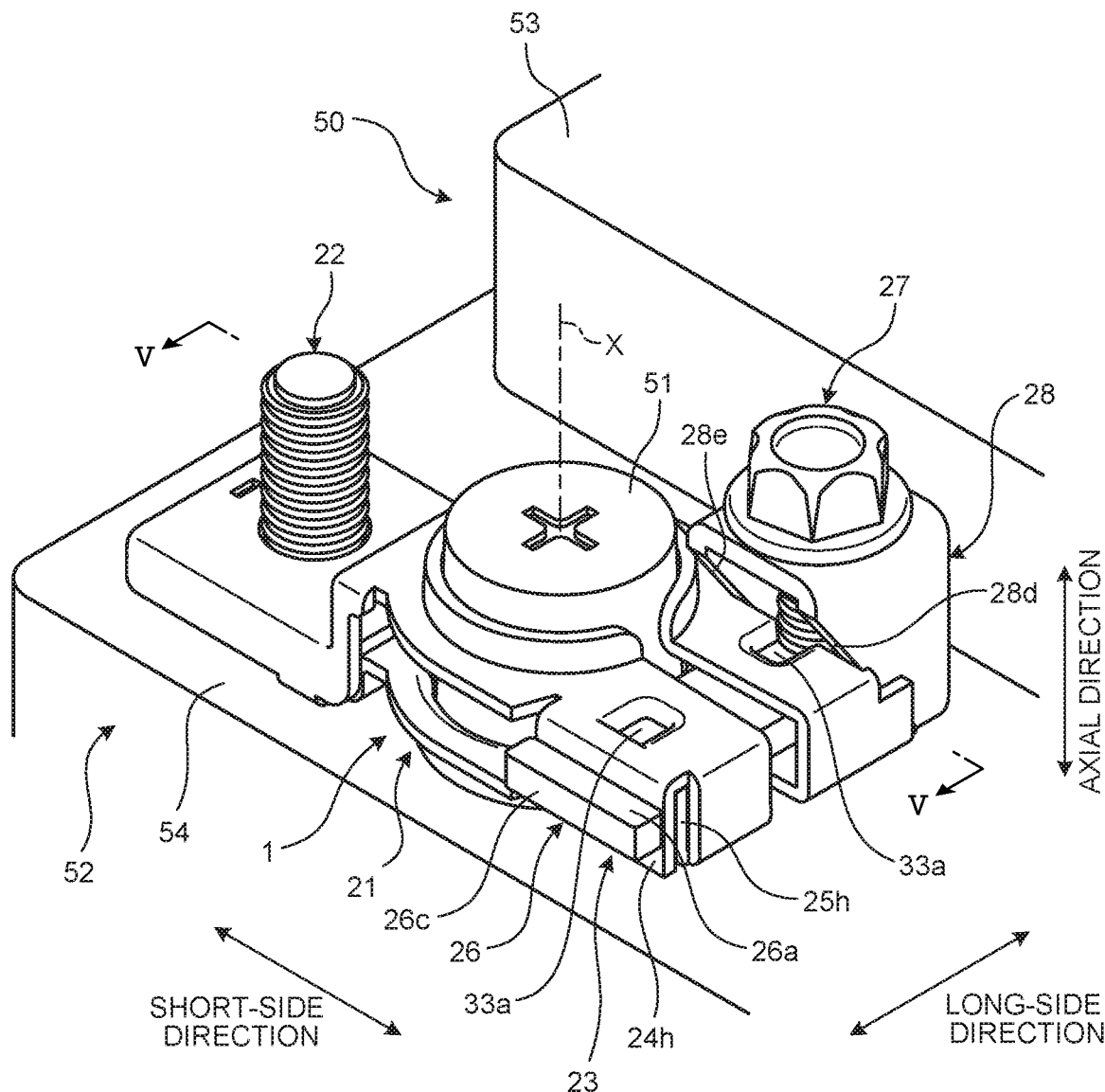
FIG. 3 is a perspective view illustrating a state in which the battery terminal illustrated in FIG. 1 is mounted on a battery post.
Figure 4:
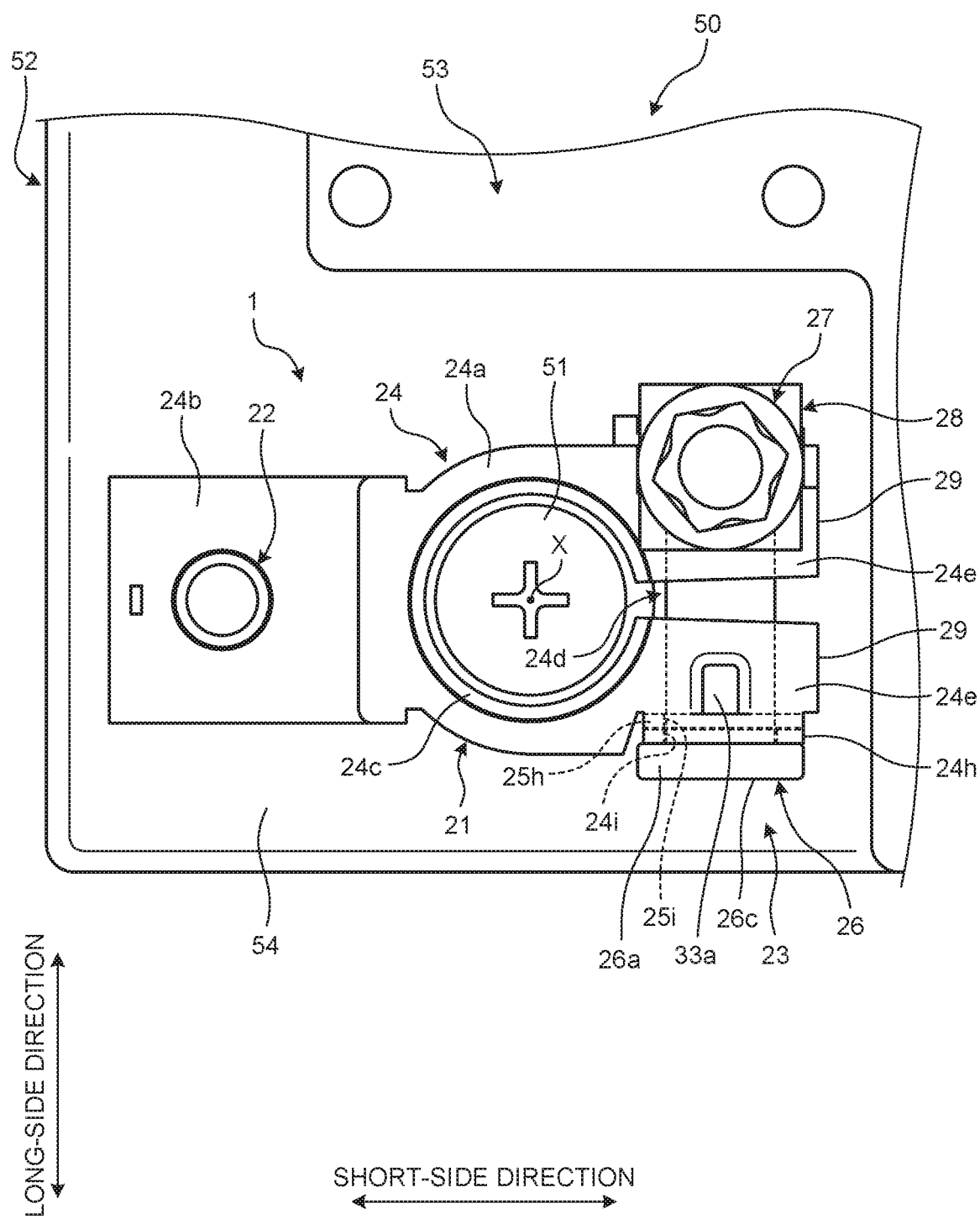
FIG. 4 is a plan view illustrating the state in which the battery terminal illustrated in FIG. 1 is mounted on the battery post.
Figure 5:
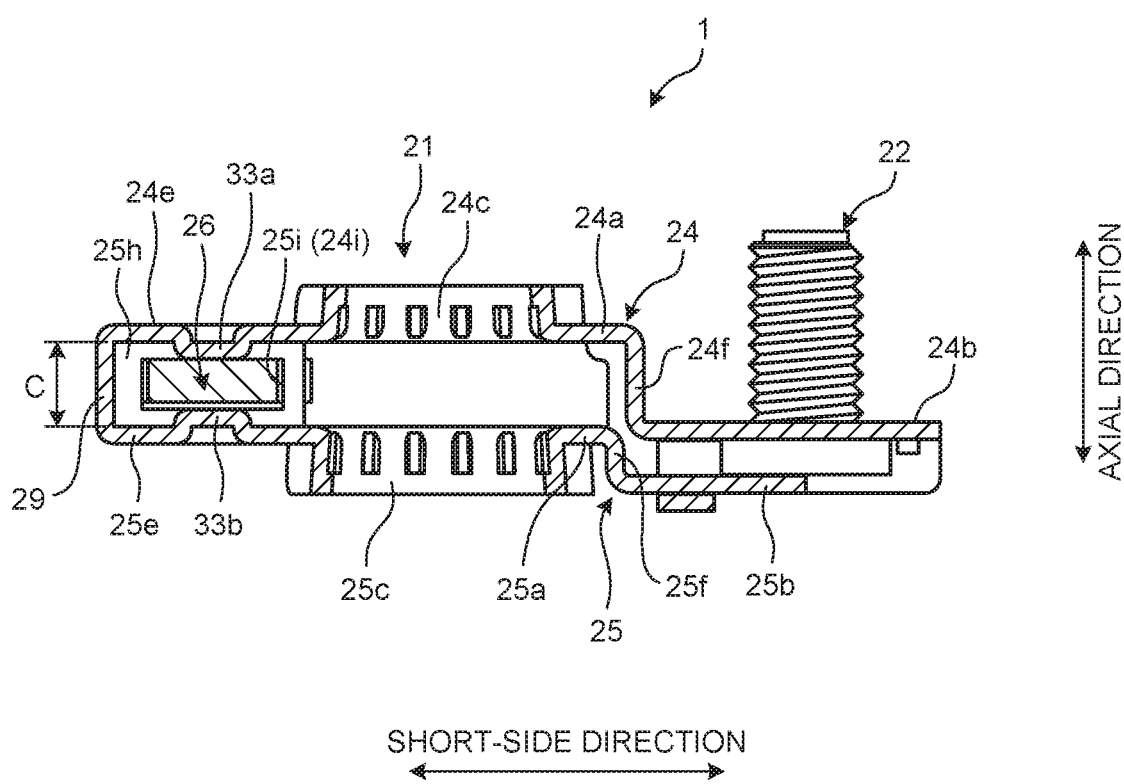
FIG. 5 is a sectional view viewed along the V-V line in FIG. 3.

FIG. 1 is a perspective view schematically illustrating the configuration of a battery terminal according to a first embodiment of the present invention. FIG. 2 is an exploded perspective view of the battery terminal illustrated in FIG. 1. FIG. 3 is a perspective view illustrating a state in which the battery terminal illustrated in FIG. 1 is mounted on a battery post. FIG. 4 is a plan view illustrating the state in which the battery terminal illustrated in FIG. 1 is mounted on the battery post. FIG. 5 is a sectional view viewed along the V-V line in FIG. 3.

A battery terminal 1 in the first embodiment is, as illustrated in FIGS. 3 and 4, fitted to a battery post 51 of a battery 50. The battery terminal 1 is a component to electrically connect, by being mounted on the battery post 51, the battery 50 with a metal fitting and the like that is provided at the end portion of an electrical wire on the main body side of a vehicle and the like in which the battery 50 is installed.

In the following description, the direction along the central axis line X of the battery post 51 is referred to as "axial direction." Furthermore, for making the following description easy to understand and for the sake of convenience, one of two directions orthogonal to the axial direction is referred to as a long-side direction (width direction) and the other is referred to as a short-side direction. The axial direction, the long-side direction, and the short-side direction are orthogonal to one another.

The battery 50 to which the battery terminal 1 is applied is installed in a vehicle and the like as a power storage device, for example. The battery 50 is configured with, as illustrated in FIGS. 3 and 4, a battery housing 52 that accommodates therein battery fluid and various components constituting the battery 50, the above-described battery post 51 provided on the battery housing 52, and others. The battery housing 52 is configured with a substantially rectangular box-shaped housing body of which any one of the surfaces is open and a cover member that closes the foregoing open surface, and is formed in a substantially rectangular parallelepiped shape as a whole.

While the battery housing 52 here has long sides in the direction along the long-side direction and has short sides in the direction along the short-side direction, it is not limited to this. The battery post 51 is composed of lead and the like, and is provided to stand on a post standing surface 53 of the cover member. The post standing surface 53 is the surface in the battery housing 52 on which the battery post 51 is provided to stand. The post standing surface 53 here is the upper surface of the cover member on the upper side in the vertical direction in a state of the battery 50 being installed in the vehicle and the like, for example. The battery post 51 is in a substantially columnar shape, and is provided to stand on the post standing surface 53 so as to project in such a positional relation that the central axis line X is orthogonal to the post standing surface 53. In more detail, the battery post 51 in the first embodiment is provided to stand in a recessed portion 54 formed near a corner position of the post standing surface 53. The recessed portion 54 is a portion caved in a substantially rectangular shape near the corner position of the post standing surface 53. That is, the battery post 51 is provided to stand on the bottom surface of the recessed portion 54 formed on the post standing surface 53 that is the upper surface of the battery housing 52. The battery post 51 is typically tapered such that the diameter becomes smaller toward the distal end side in the axial direction. That is, the battery post 51 is in a tapered shape in which the outer diameter at the distal end is smaller than the outer diameter at the base end. In the following description, explained is such a situation that, in a state in which the battery 50 is installed in the vehicle and the like, the axial direction of the battery post 51 is in a direction along the vertical direction, and the foregoing long-side direction and the short-side direction are in directions along the horizontal direction. The battery terminal 1 is fastened to the battery post 51 configured as in the foregoing.

The battery terminal 1 in the first embodiment is a terminal that is in a type of tightening a fastening member (a later-described fastening bolt 27) from the upper side in the vertical direction when fastened to the battery post 51. The battery terminal 1 in the first embodiment is fastened to the battery post 51 by converting a tightening force by the fastening member that arises in the direction along the axial direction into a pressing force in a tightening direction (width direction) intersecting the axial direction and pressing a portion of the battery terminal 1, to which the battery post 51 is inserted, by the pressing force. At this time, by configuring the fastening member to be tightened from the upper side in the vertical direction and making a work space for a tool for tightening the fastening member above the battery 50, the battery terminal 1 in the first embodiment achieves the reduction of the work space on the lateral side of the battery 50.

Specifically, the battery terminal 1 in the first embodiment includes, as illustrated in FIGS. 1 and 2, a main body 21, a stud bolt 22, and a tightening portion 23. In the following description, the directions to be the axial direction, the long-side direction, and the short-side direction in a state in which the battery terminal 1 is mounted on the battery post 51 may simply be referred to as "axial direction", "long-side direction", and "short-side direction", respectively.

As illustrated in FIGS. 1 and 2, in the main body 21 in the first embodiment, an upper segmented body 24 and a lower segmented body 25 are coupled together by a bent coupling portion 29 at the end portions on the short-side direction side of plate-like projecting portions 24e and 25e. In the main body 21, in a state in which the battery terminal 1 is mounted on the battery post 51, the upper segmented body 24, which is on the upper side in the vertical direction, and the lower segmented body 25, which is on the lower side in the vertical direction, are in a state of facing each other and being stacked in the axial direction (vertical direction). The stacking direction of the upper segmented body 24 and the lower segmented body 25 is a direction along the axial direction of the battery post 51, in a state in which the battery terminal 1 is mounted on the battery post 51, and the side that a later-described shank 22a of the stud bolt 22 projects is defined as the upper side in the stacking direction, and the opposite side is defined as the lower side in the stacking direction. The upper side in the stacking direction corresponds to the distal end side of the battery post 51, and the lower side in the stacking direction corresponds to the base end side of the battery post 51. That is, in the main body 21, the upper segmented body 24 is on the upper side in the stacking direction and the lower segmented body 25 is on the lower side in the stacking direction.

A pair of annular portions 24a and 25a is formed in a substantially annular shape, and on the respective annular portions 24a and 25a, substantially round-shaped post insertion holes 24c and 25c to which the battery post 51 is inserted are formed, and slits 24d and 25d that continue to the post insertion holes 24c and 25c are formed.

The post insertion hole 24c and the post insertion hole 25c are formed in the respective annular portions 24a and 25a so as to be in a positional relation of facing each other in the stacking direction, in a state in which the upper segmented body 24 and the lower segmented body 25 are vertically stacked and mounted on the battery post 51. In the post insertion holes 24c and 25c, respective inner circumferential wall surfaces are formed by folding back a plate in the directions of facing each other. That is, the plate is folded back to the upper side in the post insertion hole 24c and the plate is folded back to the lower side in the post insertion hole 25c. The post insertion holes 24c and 25c have, on the respective inner circumferential wall surfaces, a taper that corresponds to the above-described taper of the battery post 51. Out of the post insertion hole 24c and the post insertion hole 25c here, the inner diameter on the side that the later-described shank 22a of the stud bolt 22 projects, that is, the post insertion hole 24c side, becomes the smallest, and the inner diameter on the post insertion hole 25c side of the opposite side becomes the largest. In the post insertion holes 24c and 25c, the respective inner circumferential wall surfaces come in contact with the battery post 51, in a state in which the battery post 51 is inserted thereto.

The slit 24d and the slit 25d are formed in the respective annular portions 24a and 25a so as to be in a positional relation of facing each other in the stacking direction, in a state in which the upper segmented body 24 and the lower segmented body 25 are vertically stacked and mounted on the battery post 51. The slits 24d and 25d here are formed so as to sever a part of the annular portions 24a and 25a from the respective post insertion holes 24c and 25c. The annular portions 24a and 25a further have, at the end portion on the side on which the slits 24d and 25d are formed, the plate-like projecting portions 24e and 25e that are held and tightened by the later-described tightening portion 23. The plate-like projecting portion 24e is integrally formed so as to be continuous with a portion of the annular portion 24a in which the post insertion hole 24c is formed, without any stepped portion and others. In the same manner, the plate-like projecting portion 25e is also integrally formed so as to be continuous with a portion of the annular portion 25a in which the post insertion hole 25c is formed, without any stepped portion and others. The slit 24d runs through the plate-like projecting portion 24e from the post insertion hole 24c. The slit 25d runs through the plate-like projecting portion 25e from the post insertion hole 25c.

As illustrated in FIGS. 2 and 5, the plate-like projecting portion 24e of the annular portion 24a and the plate-like projecting portion 25e of the annular portion 25a are arranged leaving a substantially certain clearance C in the axial direction.

As illustrated in FIGS. 1 to 5, the plate-like projecting portion 24e is bent at one end in the long-side direction toward the lower side, and at an edge portion 24h bent toward the lower side, a through-hole 24i is provided to let a later-described penetration plate 26 penetrate through. Meanwhile, the plate-like projecting portion 25e is bent at the one end in the long-side direction toward the upper side, and at an edge portion 25h bent toward the upper side, a through-hole 25i is also provided to let the later-described penetration plate 26 penetrate through. The edge portion 24h of the upper segmented body 24 and the edge portion 25h of the lower segmented body 25 are formed such that, in a state in which the upper segmented body 24 and the lower segmented body 25 are joined together, they overlap each other and such that the through-hole 24i and the through-hole 25i provided thereon run through in the long-side direction.

That is, the plate-like projecting portion 24e severed by the slit 24d can also be expressed as one end portion of and the other end portion of the annular portion 24a. In the same manner, the plate-like projecting portion 25e severed by the slit 25d can also be expressed as one end portion of and the other end portion of the annular portion 25a.

As illustrated in FIG. 1, a pair of bolt-holding portions 24b and 25b is formed in a substantially rectangular shape. In the bolt-holding portion 24b, a substantially round-shaped bolt insertion hole 24g to which the stud bolt 22 is inserted is formed. The bolt-holding portions 24b and 25b are integrally formed on the side on which the slits 24d and 25d of the annular portions 24a and 25a are formed, that is, the opposite side of the side on which the plate-like projecting portions 24e and 25e are formed, so as to be continuous via stepped portions 24f and 25f and others.

The stud bolt 22 that the bolt-holding portions 24b and 25b hold is exposed in a state of being held between the bolt-holding portion 24b and the bolt-holding portion 25b such that the shank 22a projects from the bolt insertion hole 24g. In the stud bolt 22, a metal fitting and the like provided at the end of an electrical wire is electrically connected to the shank 22a that is exposed from the bolt insertion hole 24g. In the bolt-holding portions 24b and 25b, certain folded portions are formed such that a rectangular plate-like pedestal portion on which the shank 22a of the stud bolt 22 is provided to stand can be held.

The main body 21 can be made in the structure illustrated in FIGS. 1, 2, and others, by integrally forming the upper segmented body 24 and the lower segmented body 25 via the bent coupling portion 29, and bending the upper segmented body 24 and the lower segmented body 25 in a state in which the stud bolt 22 is inserted through the bolt insertion hole 24g of the bolt-holding portion 24b, for example. Note that the main body 21 in the first embodiment may be in a divided structure with the upper segmented body 24 and the lower segmented body 25.

The tightening portion 23 fastens the pair of annular portions 24a and 25a onto the battery post 51 in a state in which the battery post 51 is inserted into the post insertion holes 24c and 25c. The tightening portion 23 includes the penetration plate 26, the fastening bolt 27 (a fastening member), and a spacer 28 (a pressing-force conversion member).

The penetration plate 26 is a plate-like member that is arranged to penetrate through the slits 24d and 25d and the plate-like projecting portions 24e and 25e along the long-side direction. The penetration plate 26 penetrates through from one end portions (the end portions on which the edge portions 24h and 25h are formed) of the annular portions 24a and 25a to the other end portions of the annular portions 24a and 25a interposing the slits 24d and 25d. The penetration plate 26, by making it penetrate through the through-hole 24i provided on the edge portion 24h of the upper segmented body 24 and the through-hole 25i provided on the edge portion 25h of the lower segmented body 25, is attached to the main body 21 along the long-side direction, so as to traverse the slits 24d and 25d.

The penetration plate 26 includes a retaining portion 26a at one end portion 26c in the long-side direction thereof. The retaining portion 26a prevents the penetration plate 26 from coming off from the main body 21 to an other end portion 26d side that is an opposite side of the one end portion 26c on which the retaining portion 26a is provided, in a state in which the penetration plate 26 penetrates through both ends of the annular portions 24a and 25a, that is, in a state in which the penetration plate 26 is attached to the main body 21 penetrating through the through-holes 24i and 25i. Specifically, the retaining portion 26a is formed, at the one end portion 26c in the long-side direction of the penetration plate 26, in a size longer than the inner diameter of the through-holes 24i and 25i in the short-side direction, and is configured to abut on the edge portions 24h and 25h when the penetration plate 26 enters and passes through the through-holes 24i and 25i by a certain amount toward the other end portion 26d side.

The penetration plate 26 is further provided with, at the other end portion 26d that is on the opposite side of the one end portion 26c on which the retaining portion 26a is provided, a threaded hole 26b (a fastening-member support portion, a fastened member) running through in the axial direction. The threaded hole 26b further has a function of supporting the fastening bolt 27 at a certain position in the axial direction.

The fastening bolt 27 includes a shank 27a on which a threaded groove is formed, and a head 27b integrally formed with the shank 27a at one end portion thereof. The shank 27a is a portion that screws together with the threaded hole 26b of the penetration plate 26. The head 27b is a portion that is held by a tool and the like in order to rotate the fastening bolt 27 around the shank 27a. The fastening bolt 27 is supported to be rotatable around the axial direction by the threaded hole 26*b* of the penetration plate 26 at a certain position along the axial direction, and the shank 27*a* screws together with the threaded hole 26*b* along the axial direction. The fastening bolt 27 may simply be described as "bolt."

The spacer 28 is arranged, being penetrated by the fastening bolt 27, between the fastening bolt 27 and the penetration plate 26. The spacer 28, as illustrated in FIG. 2, includes a square-shaped base portion 28*a* including a through-hole that the shank 27*a* of the fastening bolt 27 penetrates, and includes a pair of upright portions 28*b* and 28*c* that extends toward the lower side in the vertical direction from two sides facing each other out of the four sides of the base portion 28*a*. In the base portion 28*a*, as illustrated in FIG. 2 and others, the two sides that include the upright portions 28*b* and 28*c* extend in the long-side direction. The pair of upright portions 28*b* and 28*c* of the spacer 28, when fitted, is arranged so as to clamp the penetration plate 26 from both sides in the short-side direction, and thereby the rotation of the spacer 28 around the axial direction is restricted (see FIG.

On the pair of upright portions 28*b* and 28*c* of the spacer 28, tapered surfaces 28*d* and 28*e* (first tapered surfaces) are formed on one end on the plate-like projecting portions 24*e* and 25*e* side in the long-side direction. The tapered surfaces 28*d* and 28*e* are formed at positions capable of coming in contact with the annular portions 24*a* and 25*a*, and are formed so as to be positioned on an identical virtual plane. The tapered surfaces 28*d* and 28*e* are formed at positions capable of coming in contact with later-described tapered surfaces 30 and 31 (second tapered surfaces) of the annular portions 24*a* and 25*a*.

In the first embodiment, the tapered surfaces 30 and 31 (second tapered surfaces) that come in contact with the tapered surfaces 28*d* and 28*e* of the spacer 28 are formed, on the other end portions (end portions on the side on which the spacer 28 is brought into contact) that are the end portions in the long-side direction of the annular portions 24*a* and 25*a* of the main body 21 and are on the opposite side of the one end portions (end portions on which the edge portions 24*h* and 25*h* are present) held by the retaining portion 26*a* of the penetration plate 26. The tapered surfaces 30 are formed in neighboring portions on the post insertion holes 24*c* and 25*c* side from the bent coupling portion 29, and the tapered surfaces 31 are formed leaving a certain distance (the distance between the pair of upright portions 28*b* and 28*c* of the spacer 28) from the tapered surfaces 30 in the short-side direction so as to be positioned on a virtual plane identical to that of the tapered surfaces 30. That is, on the tapered surfaces 30 and 31, the respective tapered surfaces 28*d* and 28*e* provided on the pair of upright portions 28*b* and 28*c* of the spacer 28 are disposed so as to confront them.

In the end portions between the tapered surfaces 30 and 31 of the plate-like projecting portions 24*e* and 25*e*, cut-out portions 32 are formed along the shape of the threaded hole 26*b* at portions that overlap the threaded hole 26*b* of the penetration plate 26 in the axial direction.

The tapered surfaces 28*d* and 28*e* provided on the spacer 28 and the tapered surfaces 30 and 31 provided on the annular portions 24*a* and 25*a* have inclinations in a direction of converting a tightening force in the axial direction, which arises between the fastening bolt 27 and the threaded hole 26*b* when the fastening bolt 27 comes closer toward the threaded hole 26*b* side along the axial direction along with the rotation around the axial direction, into a pressing force in a direction of reducing the intervals of the slits 24*d* and 25*d* of the annular portions 24*a* and 25*a*, that is, in the long-side direction in which the spacer 28 presses the annular portions 24*a* and 25*a* toward the retaining portion 26*a* side of the penetration plate 26 in the long-side direction. In the first embodiment, the tapered surfaces 28*d* and 28*e* of the spacer 28 have inclinations for which the widths of the upright portions 28*b* and 28*c* of the spacer 28 in the long-side direction gradually reduce as the tapered surfaces are away from the head 27*b* side of the fastening bolt 27 along the axial direction. The tapered surfaces 28*d* and 28*e* of the spacer 28 and the tapered surfaces 30 and 31 of the annular portions 24*a* and 25*a* are disposed so as to confront each other.

In the first embodiment, as illustrated in FIGS. 1 to 5, on the plate-like projecting portion 24*e* (the annular portion 24*a* that is one of the pair of annular portions 24*a* and 25*a*) of the main body 21, two pieces of projecting portions 33*a* (first projecting portions, clearance reduction portions) are provided. The projecting portions 33*a*, as illustrated in FIGS. 2 and 3, are each provided on the plate-like projecting portion 24*e* (one end portion of and the other end portion of the annular portion 24*a*) severed by the slit 24*d*. The two pieces of the projecting portions 33*a* provided on the plate-like projecting portion 24*e* are arranged at positions of substantially equal distances from the slit 24*d* along the long-side direction. The projecting portions 33*a*, as illustrated in FIG. 5, are provided to project from the plate-like projecting portion 24*e* toward the side of the penetration plate 26 that penetrates through the clearance C.

Furthermore, in the first embodiment, as illustrated in FIGS. 2 and 5, on the plate-like projecting portion 25*e* (the annular portion 25*a* that is the other one of the pair of annular portions 24*a* and 25*a*) of the main body 21, projecting portions 33*b* (second projecting portions, clearance reduction portions) are provided. The projecting portions 33*b*, as illustrated in FIG. 5, are provided to project from the plate-like projecting portion 25*e* toward the side of the penetration plate 26 that penetrates through the clearance C.

The projecting portions 33*b* provided on the plate-like projecting portion 25*e* are arranged to face the projecting portions 33*a* provided on the plate-like projecting portion 24*e*. In other words, the projecting portions 33*a* and the projecting portions 33*b* are arranged so as to overlap each other in an axial view. Consequently, as illustrated in FIG. 5, the projecting portions 33*a* and the projecting portions 33*b* are formed such that the clearance C of the plate-like projecting portions 24*e* and 25*e* is reduced at the areas in which the projecting portions 33*a* and 33*b* are arranged. That is, the projecting portions 33*a* and the projecting portions 33*b* serve as clearance reduction portions that reduce the clearance C in at least a part of the penetration area of the penetration plate 26 in the annular portions 24*a* and 25*a*, and are included in the plate-like projecting portions 24*e* and 25*e* (the annular portions 24*a* and 25*a*).

The projecting portions 33*a* and 33*b* can be provided by denting a part of the outer surfaces of the plate-like projecting portions 24*e* and 25*e* toward the clearance C side and forming dents, for example. A configuration may be possible in which either the projecting portions 33*a* provided on the plate-like projecting portion 24*e* or the projecting portions 33*b* provided on the plate-like projecting portion 25*e* is provided.

Figure 6:
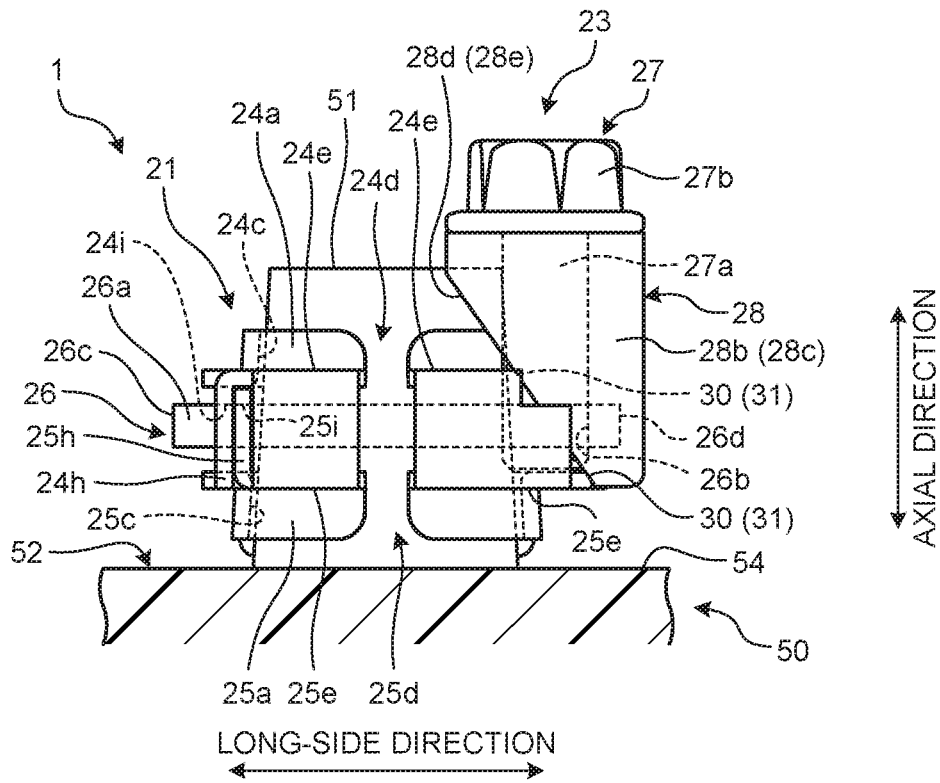
FIG. 6 is a schematic diagram illustrating a state before fastening the battery terminal according to the first embodiment to the battery post.
Figure 7:
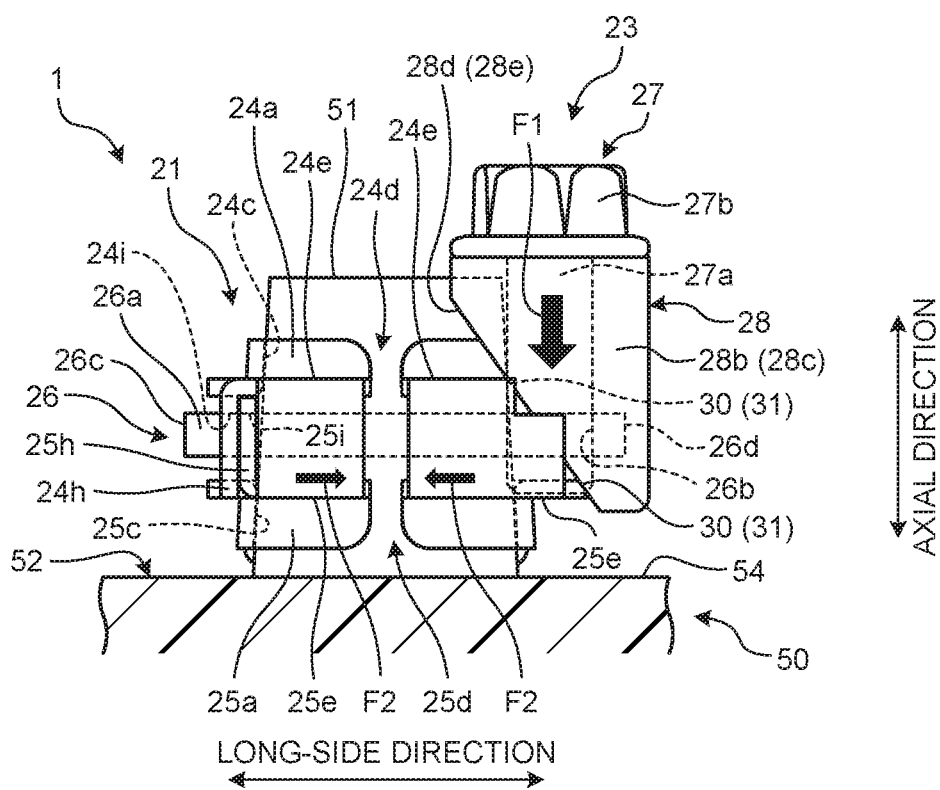
FIG. 7 is a schematic diagram illustrating a state after having fastened the battery terminal according to the first embodiment to the battery post.

Next, with reference to FIGS. 6 and 7, the operation of the battery terminal 1 in the first embodiment will be described. FIG. 6 is a schematic diagram illustrating a state before fastening the battery terminal in the first embodiment to a battery post, and FIG. 7 is a schematic diagram illustrating a state after having fastened the battery terminal in the first embodiment to the battery post.

In the battery terminal 1 in the first embodiment, when the tightening portion 23 is fitted to the main body 21, the penetration plate 26 is first inserted so as to penetrate through the through-hole 24i provided on the edge portion 24h of the plate-like projecting portion 24e, and through the through-hole 25i provided on the edge portion 25h of the plate-like projecting portion 25e. The penetration plate 26 is inserted until the retaining portion 26a is brought into contact with the edge portion 24h of the plate-like projecting portion 24e. Consequently, as illustrated in FIG. 6, the penetration plate 26 penetrates through the plate-like projecting portions 24e and 25e so as to traverse the slits 24d and 25d of the main body 21, and the other end portion 26d side of the penetration plate 26 is advanced to the outside in the long-side direction.

Next, the spacer 28 is combined with the annular portions 24a and 25a and the penetration plate 26 such that the tapered surfaces 28d and 28e of the spacer 28 come in contact with the tapered surfaces 30 and 31 of the annular portions 24a and 25a of the main body 21, and such that the through-hole of the spacer 28 overlaps the threaded hole 26b of the penetration plate 26 in the axial direction. The fastening bolt 27 is inserted to the through-hole of the spacer 28 from above in the axial direction and screwed together with the threaded hole 26b of the penetration plate 26. In this way, the tightening portion 23 is fitted to the main body 21 and the battery terminal 1 is integrally assembled.

At this time, the penetration plate 26 penetrates through between the projecting portions 33a and 33b provided on the respective plate-like projecting portions 24e and 25e, that is, the areas in which the clearance C in the axial direction has been reduced. Consequently, the axial-direction position of the other end portion 26d of the penetration plate 26 that is advanced to the outside of the main body 21 is made easy to regulate, and the variance in the axial-direction position of the end portion (the other end portion 26d, in particular) of the penetration plate 26 in the long-side direction can be reduced. Furthermore, the end portion (the other end portion 26d, in particular) of the penetration plate 26 in the long-side direction can be restrained from being varied by an external force. Thus, the spacer 28 and the fastening bolt 27 are to be easily fitted to the penetration plate 26. Moreover, by reducing the clearance C by the projecting portions 33a and 33b, the penetration plate 26 can be easily made to penetrate through the plate-like projecting portions 24e and 25e.

The state illustrated in FIG. 6 illustrates a state in which the lower end areas of the tapered surfaces 28d and 28e of the spacer 28 are in contact with the tapered surfaces 30 and 31 of the annular portions 24a and 25a, and is a state in which the fastening bolt 27 can be advanced further downward. At this time, the slits 24d and 25d of the annular portions 24a and 25a are expanded to maximum widths, and the inner diameters of the post insertion holes 24c and 25c are larger than the outer diameter of the battery post 51. This state is a state before fastening the battery terminal 1 to the battery post 51.

The battery terminal 1 in the first embodiment is fitted to the battery post 51, as the battery post 51 is inserted into the post insertion holes 24c and 25c in the state illustrated in FIG. 6. Then, in a state in which the inner circumferential surfaces of the post insertion holes 24c and 25c and the outer circumferential surface of the battery post 51 are in contact, as the fastening bolt 27 is tightened from the upper side in the vertical direction (axial direction), both sides of the annular portions 24a and 25a interposing the slits 24d and 25d are tightened in an approaching direction, and thereby the battery terminal 1 is fastened to the battery post 51.

More specifically, as illustrated in FIG. 7, when the fastening bolt 27 comes closer toward the threaded hole 26b side of the penetration plate 26 along the axial direction as the head 27b of the fastening bolt 27 is rotated around the axial direction (the shank 27a) by a tool and the like, a tightening force F1 in the axial direction arises between the fastening bolt 27 and the threaded hole 26b. By the tightening force F1 in the axial direction, the spacer 28 is pressed toward the lower side in the vertical direction with the bearing surface of the fastening bolt 27. The tightening force F1 in the axial direction is converted into a pressing force F2 in the long-side direction that presses in a direction of reducing the intervals of the slits 24d and 25d of the annular portions 24a and 25a, by the tapered surfaces 28d and 28e of the spacer 28 and the tapered surfaces 30 and 31 of the annular portions 24a and 25a with which the tapered surfaces 28d and 28e come into contact. At this time, the retaining portion 26a on the one end portion 26c side of the penetration plate 26 serves as a reaction force member that receives the reaction force of the pressing force F2 applied to the annular portions 24a and 25a by the spacer 28. As a result, in the battery terminal 1, by the pressing force F2 by the spacer 28, the plate-like projecting portions 24e and 25e of the annular portions 24a and 25a are pressed toward the retaining portion 26a side, and thereby the intervals of the slits 24d and 25d are narrowed.

Consequently, by the pressing force F2 that arises by the tapered surfaces 28d and 28e of the spacer 28 and the tapered surfaces 30 and 31 of the annular portions 24a and 25a along with the rotation of the fastening bolt 27, the intervals of the slits 24d and 25d are narrowed, and thereby the diameters of the post insertion holes 24c and 25c are reduced in a state in which the inner circumferential surfaces of the post insertion holes 24c and 25c and the outer circumferential surface of the battery post 51 are in contact, and the battery terminal 1 is fastened to the battery post 51. In the battery terminal 1, a metal fitting and the like provided at the end of an electrical wire is then electrically connected to the shank 22a of the stud bolt 22.

Meanwhile, as the fastening bolt 27 is rotated in reverse rotation, the pressing force F2 in the long-side direction that arises by the tapered surfaces 28d and 28e of the spacer 28 and the tapered surfaces 30 and 31 of the annular portions 24a and 25a is weakened, the intervals of the slits 24d and 25d are widened, and the diameters of the post insertion holes 24c and 25c are expanded, and thereby the battery terminal 1 is in a state of being detachable from the battery post 51.

As in the foregoing, the fastening bolt 27, the threaded hole 26b, and the spacer 28 of the tightening portion 23, due to the correlation among these elements, press the annular portions 24a and 25a by the pressing force F2 that ultimately arises along with the rotation of the fastening bolt 27. That is, the fastening bolt 27, the threaded hole 26b, and the spacer 28, as a functional concept that puts together the foregoing, can also be expressed as "pressing-force applying portion" that is provided at the other end portion 26d of the penetration plate 26 and that applies the pressing force F2 in the long-side direction that presses the annular portions 24a and 25a in a direction of reducing the intervals of the slits 24d and 25d of the annular portions 24a and 25a out of the long-side direction (width direction).

Next, the effect of the battery terminal 1 in the first embodiment will be described.

The battery terminal 1 in the first embodiment includes: the annular portions 24a and 25a on which the post insertion holes 24c and 25c to which the battery post 51 is inserted and the slits 24d and 25d that continue to the post insertion holes 24c and 25c are formed; the penetration plate 26 that is arranged to penetrate through from one end portions of the annular portions 24a and 25a to the other end portions of the annular portions 24a and 25a interposing the slits 24d and 25d along the long-side direction that is a direction orthogonal to the axial direction of the battery post 51 and is a direction of traversing the slits 24d and 25d; the retaining portion 26a that is provided on the one end portion 26c of the penetration plate 26 and that prevents the penetration plate 26 from coming off from the annular portions 24a and 25a, the threaded hole 26b that is provided on the other end portion 26d of the penetration plate 26 as a fastening-member support portion; and the fastening bolt 27 that is supported to be rotatable around the axial direction by the threaded hole 26b as a fastening member. The threaded hole 26b serves also as a fastened member that screws together with the fastening bolt 27.

The battery terminal 1 further includes the spacer 28 as a pressing-force conversion member that is arranged in contact with the annular portions 24a and 25a from the other end portion 26d side of the penetration plate 26 and that converts the tightening force F1 in the axial direction that arises between the fastening bolt 27 and the threaded hole 26b along with the rotation of the fastening bolt 27 around the axial direction into the pressing force F2 in the long-side direction that presses the annular portions 24a and 25a in a direction of reducing the intervals of the slits 24d and 25d of the annular portions 24a and 25a out of the long-side direction (width direction). The annular portions 24a and 25a are a pair of annular portions 24a and 25a arranged to face each other along the axial direction, and the penetration plate 26 is arranged to penetrate through the clearance C of the pair of annular portions 24a and 25a. The pair of annular portions 24a and 25a includes the projecting portions 33a and 33b that serve as a clearance reduction portion that reduces the clearance C in at least a part of the penetration area of the penetration plate 26.

With such a configuration, by the action of the spacer 28 as the pressing-force conversion member, the tightening force F1 in the axial direction that arises along with the rotation of the fastening bolt 27 around the axial direction is converted into the pressing force F2 in the long-side direction that reduces the intervals of the slits 24d and 25d of the annular portions 24a and 25a, and thereby the annular portions 24a and 25a can be fastened to the battery post 51. That is, by operating the fastening bolt 27 to rotate around the axial direction of the battery post 51, that is, around the vertical direction, the battery terminal 1 can be fastened to the battery post 51. Consequently, there is no need to secure a work space to set and rotate a tool for rotating the fastening bolt 27 from the lateral side of the battery post 51, that is, the lateral side of the battery 50, as in the conventional case, and thus the operation can be performed from above in the vertical direction of the battery 50, which is relatively easy to obtain the work space, for example. As in the foregoing, according to the battery terminal 1 in the first embodiment, the work space required in the periphery of the battery 50 when the battery terminal 1 is fastened to the battery post 51 can be reduced.

Furthermore, by providing the projecting portions 33a and 33b as clearance reduction portions on the pair of annular portions 24a and 25a (more specifically, the plate-like projecting portions 24e and 25e), the clearance between the penetration plate 26 and the annular portions 24a and 25a are reduced in a state of the penetration plate 26 penetrating through the annular portions 24a and 25a, and thereby the variance in the axial-direction position of the end portion (the other end portion 26d, in particular) of the penetration plate 26 in the long-side direction can be reduced. The end portion (the other end portion 26d, in particular) of the penetration plate 26 in the long-side direction can also be restrained from being varied by an external force. Thus, fitting the spacer 28 and the fastening bolt 27 to the penetration plate 26, and letting the penetration plate 26 penetrate through the plate-like projecting portions 24e and 25e (the annular portions 24a and 25a) can be performed easily. Consequently, by providing the projecting portions 33a and 33b, the easiness of assembling the tightening portion 23 of the battery terminal 1 can be improved.

In the battery terminal 1 in the first embodiment, the various functions of the fastening-member support portion, the fastening member, the fastened member, and the pressing-force conversion member are implemented by three components of the threaded hole 26b, the fastening bolt 27, and the spacer 28. Moreover, the retaining portion 26a and the threaded hole 26b are both configured as a part of the penetration plate 26. Consequently, the number of components to constitute the battery terminal 1 can be reduced, and the production cost can be cut down.

The fastening structure by the tightening portion 23 of the battery terminal 1 only needs to include the configuration in which, in a state in which at least the penetration plate 26 penetrates through both ends of the annular portions 24a and 25a, the annular portions 24a and 25a can be fastened to the battery post 51, and a configuration other than that of the above-described first embodiment may be possible. For example, in the above-described first embodiment, the configuration has been exemplified that, by defining the fastened member that screws together with the fastening bolt 27 as the threaded hole 26b of the penetration plate 26, makes the tightening force F1 in the axial direction arise between the fastening bolt 27 and the penetration plate 26. However, the configuration may include a separate nut as the fastened member. Furthermore, the configuration may not include the tapered surfaces 28d and 28e provided on the spacer 28 or the tapered surfaces 30 and 31 provided on the annular portions 24a and 25a.

In the above-described first embodiment, the configuration has been exemplified in which the projecting portions 33a and 33b are provided on the plate-like projecting portions 24e and 25e as the clearance reduction portions that reduce the clearance C in at least a part of the penetration area of the penetration plate 26 in the annular portions 24a and 25a. However, a configuration other than the projecting portions 33a and 33b can be applied as long as it serves as a clearance reduction portion.

In the above-described first embodiment, the configuration has been exemplified in which the projecting portions 33a and 33b are in a recessed shape viewed from the outside of the main body 21. However, they only need to project on the clearance C side inside of the plate-like projecting portions 24e and 25e. For example, the configuration may be possible in which the outer surfaces of the plate-like projecting portions 24e and 25e are not in a recessed shape but in a planar shape and the projecting portions 33a and 33b project only on the clearance C side from the inner surfaces of the plate-like projecting portions 24e and 25e. Furthermore, in the above-described first embodiment, the configuration has been exemplified that includes both of the projecting portions 33a provided on the plate-like projecting portion 24e and the projecting portions 33b provided on the plate-like projecting portion 25e. However, the configuration may be possible that includes either the projecting portions 33a or the projecting portions 33b. Moreover, in the above-described first embodiment, the configuration has been exemplified in which two pieces of the projecting portions 33a are provided on the plate-like projecting portion 24e. However, the configuration may be possible that includes either of two pieces of the projecting portions 33a, or the configuration may be possible that includes three or more pieces of the projecting portions 33a.

In the battery terminal according to the present invention, by the action of the pressing-force conversion member, the tightening force in the axial direction that arises along with the rotation of the fastening member around the axial direction is converted into the pressing force in the width direction that reduces the intervals of the slits of the annular portions, and thereby the annular portions can be fastened to the battery post. That is, there is no need to secure a work space to set and rotate a tool for rotating the fastening member from the lateral side of the battery post, that is, the lateral side of the battery, as in the conventional case, and thus the operation can be performed from above in the vertical direction of the battery, which is relatively easy to obtain the work space, for example. Consequently, the battery terminal in the present invention has an effect of being capable of reducing the work space required in the periphery of the battery when fastened to the battery post.

Second Embodiment

Figure 8:
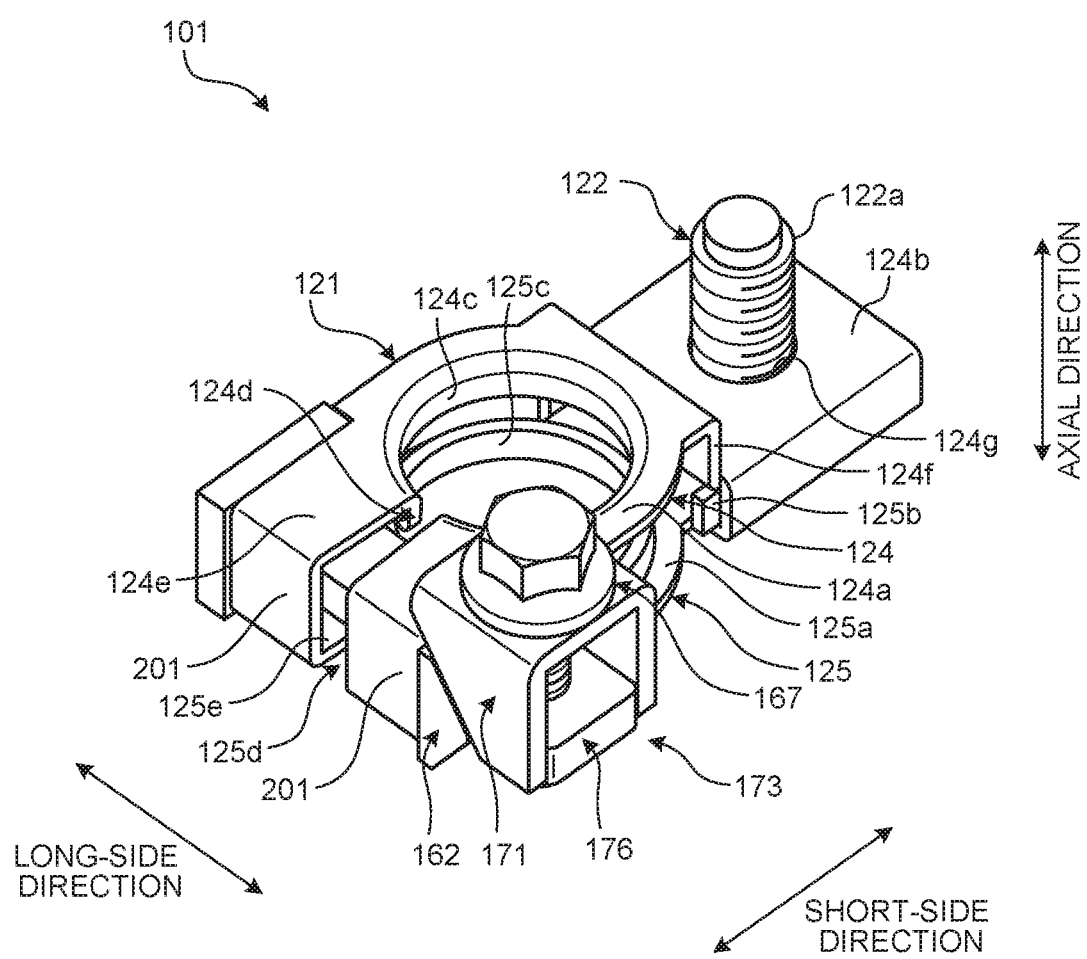
FIG. 8 is a perspective view schematically illustrating the configuration of a battery terminal according to a second embodiment of the invention.
Figure 9:
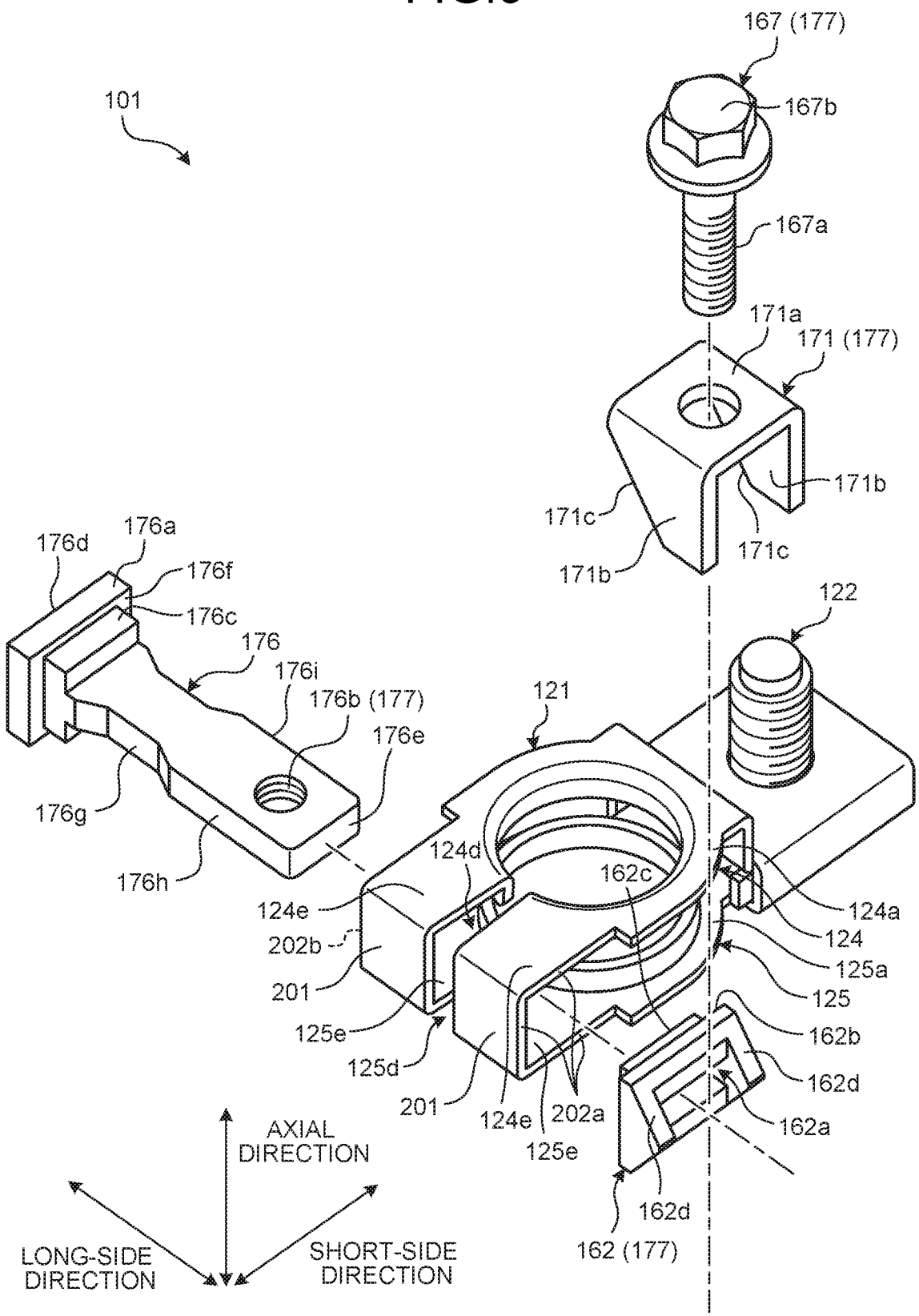
FIG. 9 is an exploded perspective view of the battery terminal illustrated in FIG. 8.
Figure 10:
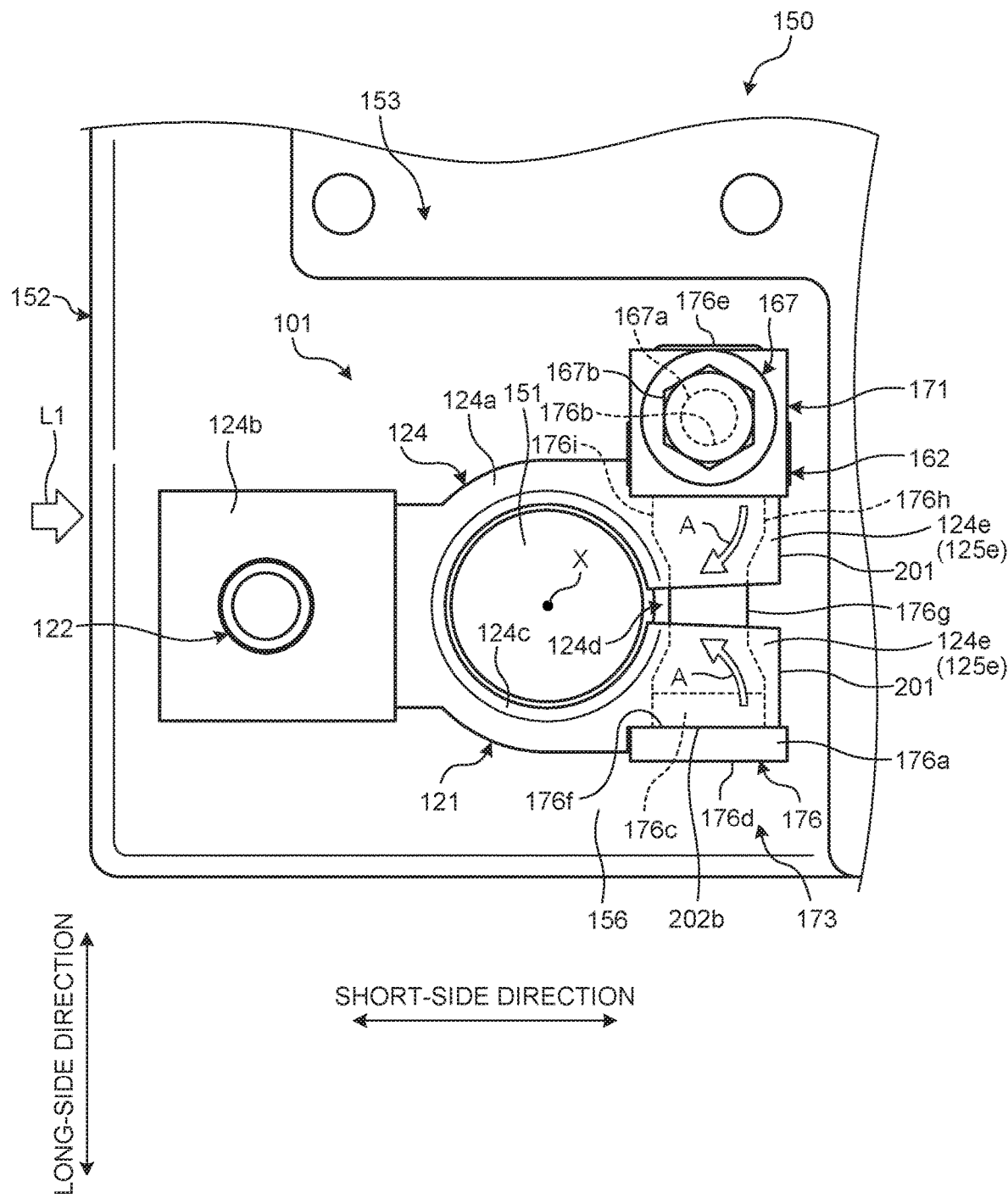
FIG. 10 is a plan view illustrating the state in which the battery terminal illustrated in FIG. 8 is mounted on the battery post.
Figure 11:
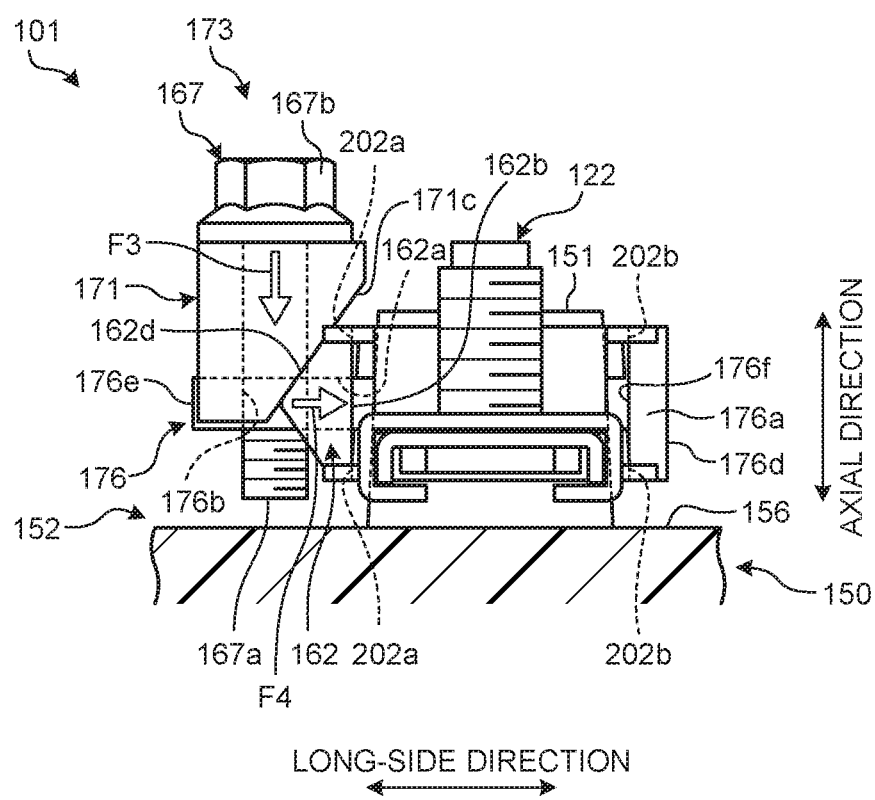
FIG. 11 is a diagram viewed from the arrow direction L1 in FIG. 10.

FIG. 8 is a perspective view schematically illustrating the configuration of a battery terminal according to a second embodiment of the invention. FIG. 9 is an exploded perspective view of the battery terminal illustrated in FIG. 8. FIG. 10 is a plan view illustrating the state in which the battery terminal illustrated in FIG. 8 is mounted on the battery post. FIG. 11 is a diagram viewed from the arrow direction L1 in FIG. 10.

A battery terminal 101 in the second embodiment is, as illustrated in FIGS. 10 and 11, fitted to a battery post 151 of a battery 150. The battery terminal 101 is a component to electrically connect, by being mounted on the battery post 151, the battery 150 with a metal fitting and the like that is provided at the end portion of an electrical wire on the main body side of a vehicle and the like in which the battery 150 is installed.

In the following description, the direction along the central axis line X of the battery post 151 is referred to as "axial direction." Furthermore, for making the following description easy to understand and for the sake of convenience, one of two directions orthogonal to the axial direction is referred to as a long-side direction (width direction) and the other is referred to as a short-side direction. The axial direction, the long-side direction, and the short-side direction are orthogonal to one another.

The battery 150 to which the battery terminal 101 is applied is installed in a vehicle and the like as a power storage device, for example. The battery 150 is configured with, as illustrated in FIGS. 10 and 11, a battery housing 152 that accommodates therein battery fluid and various components constituting the battery 150, the above-described battery post 151 provided on the battery housing 152, and others. The battery housing 152 is configured with a substantially rectangular box-shaped housing body of which any one of the surfaces is open and a cover member that closes the foregoing open surface, and is formed in a substantially rectangular parallelepiped shape as a whole.

While the battery housing 152 here has long sides in the direction along the long-side direction and has short sides in the direction along the short-side direction, it is not limited to this. The battery post 151 is composed of lead and the like, and is provided to stand on a post standing surface 153 of the cover member. The post standing surface 153 is the surface in the battery housing 152 on which the battery post 151 is provided to stand. The post standing surface 153 here is the upper surface of the cover member on the upper side in the vertical direction in a state of the battery 150 being installed in the vehicle and the like, for example. The battery post 151 is in a substantially columnar shape, and is provided to stand on the post standing surface 153 so as to project in such a positional relation that the central axis line X is orthogonal to the post standing surface 153. In more detail, the battery post 151 in the second embodiment is provided to stand in a recessed portion 156 formed near a corner position of the post standing surface 153. The recessed portion 156 is a portion caved in a substantially rectangular shape near the corner position of the post standing surface 153. That is, the battery post 151 is provided to stand on the bottom surface of the recessed portion 156 formed on the post standing surface 153 that is the upper surface of the battery housing 152. The battery post 151 is typically tapered such that the diameter becomes smaller toward the distal end side in the axial direction. That is, the battery post 151 is in a tapered shape in which the outer diameter at the distal end is smaller than the outer diameter at the base end. In the following description, explained is such a situation that, in a state in which the battery 150 is installed in the vehicle and the like, the axial direction of the battery post 151 is in a direction along the vertical direction, and the foregoing long-side direction and the short-side direction are in directions along the horizontal direction. The battery terminal 101 is fastened to the battery post 151 configured as in the foregoing.

The battery terminal 101 in the second embodiment is a terminal that is in a type of tightening a fastening member (a later-described fastening bolt 167) from the upper side in the vertical direction when fastened to the battery post 151. The battery terminal 101 in the second embodiment is fastened to the battery post 151 by converting a tightening force by the fastening member that arises in the direction along the axial direction into a pressing force in a tightening direction (width direction) intersecting the axial direction and pressing a portion of the battery terminal 101, to which the battery post 151 is inserted, by the pressing force. At this time, by configuring the fastening member to be tightened from the upper side in the vertical direction and making a work space for a tool for tightening the fastening member above the battery 150, the battery terminal 101 in the second embodiment achieves the reduction of the work space on the lateral side of the battery 150.

Specifically, the battery terminal 101 in the second embodiment includes, as illustrated in FIGS. 8 and 9, a main body 121, a stud bolt 122, and a tightening portion 173. In the following description, the directions to be the axial direction, the long-side direction, and the short-side direction in a state in which the battery terminal 101 is mounted on the battery post 151 may simply be referred to as "axial direction", "long-side direction", and "short-side direction", respectively.

As illustrated in FIGS. 8 and 9, in the main body 121 in the second embodiment, an upper segmented body 124 and a lower segmented body 125 are coupled together by a bent coupling portion 201 at the end portions on the short-side direction side of the plate-like projecting portions 124e and 125e. In the main body 121, in a state in which the battery terminal 101 is mounted on the battery post 151, the upper segmented body 124, which is on the upper side in the vertical direction, and the lower segmented body 125, which is on the lower side in the vertical direction, are in a state of facing each other and being stacked in the axial direction (vertical direction). The stacking direction of the upper segmented body 124 and the lower segmented body 125 is a direction along the axial direction of the battery post 151, in a state in which the battery terminal 101 is mounted on the battery post 151, and the side that a later-described shank 122a of the stud bolt 122 projects is defined as the upper side in the stacking direction, and the opposite side is defined as the lower side in the stacking direction. The upper side in the stacking direction corresponds to the distal end side of the battery post 151, and the lower side in the stacking direction corresponds to the base end side of the battery post 151. That is, in the main body 121, the upper segmented body 124 is on the upper side in the stacking direction and the lower segmented body 125 is on the lower side in the stacking direction.

A pair of annular portions 124a and 125a is formed in a substantially annular shape, and on the respective annular portions 124a and 125a, substantially round-shaped post insertion holes 124c and 125c to which the battery post 151 is inserted are formed, and slits (clearances) 124d and 125d that continue to the post insertion holes 124c and 125c are formed.

The post insertion hole 124c and the post insertion hole 125c are formed in the respective annular portions 124a and 125a so as to be in a positional relation of facing each other in the stacking direction, in a state in which the upper segmented body 124 and the lower segmented body 125 are vertically stacked and mounted on the battery post 151. In the post insertion holes 124c and 125c, respective inner circumferential wall surfaces are formed by folding back a plate in the directions of facing each other. That is, the plate is folded back to the lower side in the post insertion hole 124c and the plate is folded back to the upper side in the post insertion hole 125c. The post insertion holes 124c and 125c have, on the respective inner circumferential wall surfaces, a taper that corresponds to the above-described taper of the battery post 151. Out of the post insertion hole 124c and the post insertion hole 125c here, the inner diameter on the side that the later-described shank 122a of the stud bolt 122 projects, that is, the post insertion hole 124c side, becomes the smallest, and the inner diameter on the post insertion hole 125c side of the opposite side becomes the largest. In the post insertion holes 124c and 125c, the respective inner circumferential surfaces come in contact with the battery post 151, in a state in which the battery post 151 is inserted thereto.

The slit 124d and the slit 125d are formed in the respective annular portions 124a and 125a so as to be in a positional relation of facing each other in the stacking direction, in a state in which the upper segmented body 124 and the lower segmented body 125 are vertically stacked and mounted on the battery post 151. The slits 124d and 125d here are formed so as to sever a part of the annular portions 124a and 125a from the respective post insertion holes 124c and 125c. The annular portions 124a and 125a further have, at the end portion on the side on which the slits 124d and 125d are formed, the plate-like projecting portions 124e and 125e that are held and tightened by the later-described tightening portion 173. The plate-like projecting portion 124e is integrally formed so as to be continuous with a portion of the annular portion 124a in which the post insertion hole 124c is formed, without any stepped portion and others. In the same manner, the plate-like projecting portion 125e is also integrally formed so as to be continuous with a portion of the annular portion 125a in which the post insertion hole 125c is formed, without any stepped portion and others. The slit 124d runs through the plate-like projecting portion 124e from the post insertion hole 124c. The slit 125d runs through the plate-like projecting portion 125e from the post insertion hole 125c.

As illustrated in FIG. 8, a pair of bolt-holding portions 124b and 125b is formed in a substantially rectangular shape. In the bolt-holding portion 124b, a substantially round-shaped bolt insertion hole 124g to which the stud bolt 122 is inserted is formed.

The stud bolt 122 that the bolt-holding portions 124b and 125b hold is exposed in a state of being held between the bolt-holding portion 124b and the bolt-holding portion 125b such that the shank 122a projects from the bolt insertion hole 124g. In the stud bolt 122, a metal fitting and the like provided at the end of an electrical wire is electrically connected to the shank 122a that is exposed from the bolt insertion hole 124g. In the bolt-holding portions 124b and 125b, certain folded portions are formed such that a rectangular plate-like pedestal portion on which the shank 122a of the stud bolt 122 is provided to stand can be held.

The main body 121 can be made in the structure illustrated in FIGS. 8, 9, and others, by integrally forming the upper segmented body 124 and the lower segmented body 125 via the bent coupling portion 201, and bending the upper segmented body 124 and the lower segmented body 125 in a state in which the stud bolt 122 is inserted through the bolt insertion hole 124g of the bolt-holding portion 124b, for example. Note that the main body 121 in the second embodiment may be in a divided structure with the upper segmented body 124 and the lower segmented body 125.

In the main body 121, as illustrated in FIG. 9, the side surfaces on both sides of the plate-like projecting portions 124e and 125e in the long-side direction are cut out and opened toward the slits 124d and 125d along the long-side direction, in a state in which the upper segmented body 124 and the lower segmented body 125 are fitted to each other. In a pair of these openings on both sides in the long-side direction, the end surfaces of the plate-like projecting portions 124e and 125e and the bent coupling portion 201 form pressed surfaces 202a and 202b of substantially U shape orthogonal to the long-side direction. The pressed surfaces 202a and 202b are portions that come in surface contact with a second spacer 162 and a retaining portion 176a (a holding portion for the annular portions) to be described later, and are portions that receive a pressing force in a direction of reducing the slits 124d and 125d from both the second spacer 162 and the retaining portion 176a. In a state in which the battery terminal 101 is assembled as illustrated in FIG. 8, the pressed surface 202a is the end surface on the side in which a threaded hole 176b of a penetration plate 176 is positioned, whereas the pressed surface 202b is the end surface on the side in which a retaining portion 176a of the penetration plate 176 is positioned.

The tightening portion 173 fastens the pair of annular portions 124a and 125a onto the battery post 151 in a state in which the battery post 151 is inserted into the post insertion holes 124c and 125c. The tightening portion 173 includes the penetration plate 176, the fastening bolt 167 (a fastening member), a first spacer 171 (a pressing-force conversion member), and the second spacer 162 (a pressing-force conversion member).

The penetration plate 176 is a plate-like member that is arranged to penetrate through the slits 124d and 125d and the plate-like projecting portions 124e and 125e along the long-side direction. The penetration plate 176 penetrates through from one end portions of the annular portions 124a and 125a to the other end portions of the annular portions 124a and 125a interposing the slits 124d and 125d.

The penetration plate 176 includes the retaining portion 176a at one end portion 176d in the long-side direction thereof. The retaining portion 176a prevents the penetration plate 176 from coming off from the main body 121 to another end portion 176e side that is an opposite side of the one end portion 176d on which the retaining portion 176a is provided, in a state in which the penetration plate 176 penetrates through both ends of the annular portions 124a and 125a. Specifically, the retaining portion 176a is formed projecting to both sides in the short-side direction and both sides in the axial direction, at the one end portion 176d in the long-side direction of the penetration plate 176. That is, the retaining portion 176a is integrally provided with the penetration plate 176 at the one end portion 176d of the penetration plate 176. The retaining portion 176a includes, as illustrated in FIG. 9, a contact surface 176f that is arranged to face and be capable of coming in contact with the pressed surface 202b of the annular portions 124a and 125a. In the penetration plate 176, a projecting portion 176c that projects from the contact surface 176f to the other end portion 176e side is provided adjacent to the retaining portion 176a. The penetration plate 176 is prevented from coming off to the pressed surface 202a side of the main body 121 by bringing the contact surface 176f of the retaining portion 176a into contact with the pressed surface 202b of the annular portions 124a and 125a and fitting the projecting portion 176c into the opening on the more central side than the pressed surface 202b.

The penetration plate 176 is further provided with, at the other end portion 176e that is on the opposite side of the one end portion 176d on which the retaining portion 176a is provided, a threaded hole 176b (a fastening-member support portion, a fastened member) running through in the axial direction. The threaded hole 176b further has a function of supporting the fastening bolt 167 at a certain position in the axial direction.

The penetration plate 176 further includes a pair of longitudinal side end surfaces 176h and 176i that is arranged to face each other in the short-side direction. The longitudinal side end surfaces 176h and 176i each extend in the long-side direction and face the opposite side in the short-side direction. Out of the pair of longitudinal side end surfaces 176h and 176i, a lightening portion 176g (a recessed portion) is provided on the longitudinal side end surface 176h that is arranged outside of the annular portions 124a and 125a (the side farther from the central axis line X), in a state in which the penetration plate 176 penetrates through both ends of the annular portions 124a and 125a.

As illustrated in FIGS. 9 and 10, the lightening portion 176g is formed by eliminating part of the longitudinal side end surface 176h so as to reduce the size of the penetration plate 176 in the short-side direction to the other longitudinal side end surface 176i side. In other words, the lightening portion 176g is formed such that, when compared with a clearance between the one longitudinal side end surface 176h of the penetration plate 176 on which the lightening portion 176g is provided and the bent coupling portion 201, the clearance between the bottom (the portion positioned closest to the other longitudinal side end surface 176i side) of the lightening portion 176g and the bent coupling portion 201 becomes wide. The lightening portion 176g is formed, as illustrated in FIG. 10, substantially evenly on both sides of the long-side direction with the portion exposed from the slits 124d and 125d as its center, in a state in which the penetration plate 176 penetrates through both ends of the annular portions 124a and 125a.

The fastening bolt 167 includes a shank 167a on which a threaded groove is formed, and a head 167b integrally formed with the shank 167a at one end portion thereof. The shank 167a is a portion that screws together with the threaded hole 176b of the penetration plate 176. The head 167b is a portion that is held by a tool and the like in order to rotate the fastening bolt 167 around the shank 167a. The fastening bolt 167 is supported to be rotatable around the axial direction by the threaded hole 176b of the penetration plate 176 at a certain position along the axial direction, and the shank 167a screws together with the threaded hole 176b along the axial direction.

The first spacer 171 is arranged, being penetrated by the fastening bolt 167, between the fastening bolt 167 and the penetration plate 176. The first spacer 171 includes a square-shaped base portion 171a including a through-hole that the shank 167a of the fastening bolt 167 penetrates, and includes a pair of upright portions 171b that extends toward the lower side in the vertical direction from two sides facing each other out of the four sides of the base portion 171a. In the base portion 171a, as illustrated in FIGS. 8, 9 and others, the two sides that include the upright portions 171b extend in the long-side direction. The pair of upright portions 171b of the first spacer 171, when fitted, is arranged so as to clamp the penetration plate 176 from both sides in the short-side direction, as illustrated in FIG. 8 and others, and thereby the rotation of the first spacer 171 around the axial direction is restricted.

On the pair of upright portions 171b of the first spacer 171, tapered surfaces 171c (first tapered surfaces) are formed on one end on the plate-like projecting portions 124e and 125e side in the long-side direction. The tapered surfaces 171c are formed at positions capable of coming in contact with tapered surfaces 162d (second tapered surfaces) of the second spacer 162.

The second spacer 162 is arranged to be movable relatively to the penetration plate 176 in the long-side direction, and one end in the long-side direction thereof comes in contact with the annular portions 124a and 125a, whereas the other end in the long-side direction thereof comes in contact with the first spacer 171. The second spacer 162 is provided with a through-hole 162a running through in the long-side direction, through which the penetration plate 176 is inserted so that the second spacer 162 is movable relatively to the penetration plate 176 in the long-side direction.

An end surface 162b on one end side in the long-side direction of the second spacer 162 comes in contact with the pressed surface 202a of the annular portions 124a and 125a from the end portion (the other end portion 176e) side of the penetration plate 176 on which the threaded hole 176b is provided. The central portion of the end surface 162b is provided with a projecting portion 162c that projects to the annular portions 124a and 125a side. The relative movement of the second spacer 162 with respect to the main body 121 in the short-side direction and around the axial direction is restricted by bringing the end surface 162b into contact with the pressed surface 202a and fitting the projecting portion 162c into the opening on the more central side than the pressed surface 202a of the annular portions 124a and 125a. The tapered surfaces 162d (second tapered surfaces) that come in contact with the tapered surfaces 171c of the first spacer 171 are formed on the other end side in the long-side direction of the second spacer 162.

The tapered surfaces 171c provided on the first spacer 171 and the tapered surfaces 162d provided on the second spacer 162 have inclinations in a direction of converting a tightening force in the axial direction, which arises between the fastening bolt 167 and the threaded hole 176b when the fastening bolt 167 comes closer toward the threaded hole 176b side along the axial direction along with the rotation around the axial direction, into a pressing force in a direction of reducing the intervals of the slits 124d and 125d of the annular portions 124a and 125a, that is, in the long-side direction in which the second spacer 162 presses the annular portions 124a and 125a toward the retaining portion 176a side of the penetration plate 176 in the long-side direction. In the second embodiment, the tapered surfaces 171c of the first spacer 171 have inclinations for which the widths of the upright portions 171b of the first spacer 171 in the long-side direction gradually reduce as the tapered surfaces are away from the head 167b side of the fastening bolt 167 along the axial direction. The tapered surfaces 171c of the first spacer 171 and the tapered surfaces 162d of the second spacer 162 are disposed so as to confront each other.

In the second embodiment, when the tightening portion 173 is fitted to the main body 121, the second spacer 162 is first fitted to the main body 121 so that the end surface 162b of the second spacer 162 and the pressed surface 202a of the main body 121 come in contact with each other. Next, the other end portion 176e of the penetration plate 176 is inserted from the opening on the pressed surface 202b side of the main body 121. The penetration plate 176 is inserted until the contact surface 176f of the retaining portion 176a comes in contact with the pressed surface 202b of the main body 121. Consequently, the penetration plate 176 penetrates through the plate-like projecting portions 124e and 125e so as to traverse the slits 124d and 125d of the main body 121, and the other end portion 176e side of the penetration plate 176 is advanced from the through-hole 162a of the second spacer 162 to the outside in the long-side direction.

Next, the first spacer 171 is combined with the second spacer 162 and the penetration plate 176 such that the tapered surfaces 171c of the first spacer 171 come in contact with the tapered surfaces 162d of the second spacer 162, and such that the through-hole of the first spacer 171 overlaps the threaded hole 176b of the penetration plate 176 in the axial direction. The fastening bolt 167 is inserted into the through-hole of the first spacer 171 from above in the axial direction and screwed together with the threaded hole 176b of the penetration plate 176. In this way, the tightening portion 173 is fitted to the main body 121.

The battery terminal 101 in the second embodiment is fitted to the battery post 151, as the battery post 151 is inserted into the post insertion holes 124c and 125c in the state illustrated in FIGS. 10 and 11. Then, in a state in which the inner circumferential surfaces of the post insertion holes 124c and 125c and the outer circumferential surface of the battery post 151 are in contact, as the fastening bolt 167 is tightened from the upper side in the vertical direction (axial direction), both sides of the annular portions 124a and 125a interposing the slits 124d and 125d are tightened in an approaching direction, and thereby the battery terminal 101 is fastened to the battery post 151.

More specifically, when the fastening bolt 167 comes closer toward the threaded hole 176b side of the penetration plate 176 along the axial direction as the head 167b of the fastening bolt 167 is rotated around the axial direction (the shank 167a) by a tool and the like, a tightening force F3 in the axial direction arises between the fastening bolt 167 and the threaded hole 176b, as illustrated in FIG. 11. By the tightening force F3 in the axial direction, the first spacer 171 is pressed toward the lower side in the vertical direction with the bearing surface of the fastening bolt 167. The tightening force F3 in the axial direction is converted into a pressing force F4 in the long-side direction that presses in a direction of reducing the intervals of the slits 124d and 125d of the annular portions 124a and 125a, by the tapered surfaces 171c of the first spacer 171 and the tapered surfaces 162d of the second spacer 162 with which the tapered surfaces 171c come into contact. The end surface 162b of the second spacer 162 presses the pressed surface 202a of the annular portions 124a and 125a by the pressing force F4. At this time, the retaining portion 176a on the one end portion 176d side of the penetration plate 176 serves as a reaction force member that receives the reaction force of the pressing force F4 applied to the annular portions 124a and 125a by the second spacer 162. As a result, in the battery terminal 101, by the pressing force F4 by the second spacer 162, the plate-like projecting portions 124e and 125e of the annular portions 124a and 125a are pressed toward the retaining portion 176a side, and thereby the intervals of the slits 124d and 125d are narrowed.

Consequently, by the pressing force F4 that arises by the tapered surfaces 171c of the first spacer 171 and the tapered surfaces 162d of the second spacer 162 along with the rotation of the fastening bolt 167, the intervals of the slits 124d and 125d are narrowed, and thereby the diameters of the post insertion holes 124c and 125c are reduced in a state in which the inner circumferential surfaces of the post insertion holes 124c and 125c and the outer circumferential surface of the battery post 151 are in contact, and the battery terminal 101 is fastened to the battery post 151.

As in the foregoing, the fastening bolt 167, the threaded hole 176b, the first spacer 171, and the second spacer 162 of the tightening portion 173, due to the correlation among these elements, press the annular portions 124a and 125a via the second spacer 162 by the pressing force F4 that ultimately arises along with the rotation of the fastening bolt 167. That is, as illustrated in FIG. 9, the fastening bolt 167, the threaded hole 176b, the first spacer 171, and the second spacer 162, as a functional concept that puts together the foregoing, can also be expressed as "pressing-force applying portion 177" that is provided at the other end portion 176e of the penetration plate 176 and that applies the pressing force F4 in the long-side direction that presses the annular portions 124a and 125a in a direction of reducing the intervals of the slits 124d and 125d of the annular portions 124a and 125a out of the long-side direction (width direction).

Next, the effect of the battery terminal 101 in the second embodiment will be described.

The battery terminal 101 in the second embodiment includes: the annular portions 124a and 125a on which the post insertion holes 124c and 125c to which the battery post 151 is inserted and the slits 124d and 125d that continue to the post insertion holes 124c and 125c are formed; the penetration plate 176 that is arranged to penetrate through from one end portions of the annular portions 124a and 125a to the other end portions of the annular portions 124a and 125a interposing the slits 124d and 125d along the long-side direction that is a direction orthogonal to the axial direction of the battery post 151 and is a direction of traversing the slits 124d and 125d; the retaining portion 176a that is provided on the one end portion 176d of the penetration plate 176 and that prevents the penetration plate 176 from coming off from the annular portions 124a and 125a; and the pressing-force applying portion 177 that is provided at the other end portion 176e of the penetration plate 176 and that applies the pressing force F4 in the long-side direction that presses the annular portions 124a and 125a in a direction of reducing the intervals of the slits 124d and 125d of the annular portions 124a and 125a out of the long-side direction (width direction). The penetration plate 176 includes a pair of longitudinal side end surfaces 176h and 176i that extends in the long-side direction and is arranged to face each other in the short-side direction orthogonal to the long-side direction and the axial direction. Out of the pair of longitudinal side end surfaces 176h and 176i, the longitudinal side end surface 176h that is arranged outside of the annular portions 124a and 125a (the side farther from the central axis line X) includes, at least at the portion exposed from the slits 124d and 125d, the lightening portion 176g that is formed so as to reduce the size of the penetration plate 176 in the short-side direction to the other longitudinal side end surface 176i side.

In the battery terminal 101 in the second embodiment, the annular portions 124a and 125a are a pair of annular portions 124a and 125a arranged to face each other along the axial direction, and the pair of annular portions 124a and 125a is coupled together by the bent coupling portion 201 that extends in the axial direction at the end portions positioned at the outer edges of the slits 124d and 125d (that is, the end portions on the short-side direction side of the plate-like projecting portions 124e and 125e). The lightening portion 176g is formed such that, when compared with a clearance between the one longitudinal side end surface 176h of the penetration plate 176 on which the lightening portion 176g is provided and the bent coupling portion 201, the clearance between the lightening portion 176g and the bent coupling portion 201 becomes wide.

With such a configuration, the annular portions 124a and 125a can be fastened more strongly to the battery post 151 by providing the lightening portion 176g in the penetration plate 176. Consequently, fastening performance when the battery terminal is fastened to the battery post 151 can be improved. The following further describes the point of such an effect produced by providing the lightening portion 176g.

The one longitudinal side end surface 176h of the penetration plate 176 on which the lightening portion 176g is provided is arranged to face the outside of the annular portions 124a and 125a, that is, the bent coupling portion 201 that connects the outer edges of the plate-like projecting portions 124e and 125e in the short-side direction, as illustrated in FIG. 10. Consequently, as in the foregoing configuration, providing the lightening portion 176g on the longitudinal side end surface 176h of the penetration plate 176 enables the clearance between the penetration plate 176 and the bent coupling portion 201 to be kept wide along the short-side direction near the slits 124d and 125d.

Meanwhile, when fastened to the battery post 151, the battery terminal 101 is tightened in a direction of reducing the intervals of the slits 124d and 125d by the pressing force F4 in the long-side direction applied to the plate-like projecting portions 124e and 125e of the annular portions 124a and 125a by the tightening portion 173 as in the foregoing. At this time, as the pressing force F4 relatively increases, the plate-like projecting portions 124e and 125e tend to deform so as to hold the battery post 151 as indicated by arrows A in FIG. 10. That is, in the slits 124d and 125d, the end surfaces outside of the plate-like projecting portions 124e and 125e (the bent coupling portion 201 side) come closer toward each other while shifting toward the inside (the post insertion holes 124c and 125c side).

At this time, in the battery terminal 101 in the second embodiment, the clearance between the penetration plate 176 and the bent coupling portion 201 is kept wide by providing the lightening portion 176g in the penetration plate 176 as in the foregoing. Thus, a situation in which the bent coupling portion 201 of the annular portions 124a and 125a comes in contact with the penetration plate 176 can be restrained from occurring. Consequently, the plate-like projecting portions 124e and 125e of the annular portions 124a and 125a are difficult to be interfered by the penetration plate 176, and thus can easily continue to deform so as to hold the battery post 151. As a result, the annular portions 124a and 125a can be fastened more strongly to the battery post 151. Thus, the battery terminal 101 in the second embodiment can increase the holding force applied to the battery post 151 when fastened to the battery post 151, and can improve the fastening performance when fastened to the battery post 151.

In order to confirm the foregoing effect, a fastening torque input to the fastening bolt 167 and a holding force output to the battery post 151 according to the fastening torque were gauged for both the configuration of the second embodiment in which the lightening portion 176g is provided in the penetration plate 176 and the configuration of a comparative example in which the lightening portion 176g is not provided in the penetration plate 176. The result has confirmed that the configuration of the second embodiment can improve its holding force by approximately 20% with respect to the comparative example and improve its fastening performance when the battery terminal 101 is fastened to the battery post 151.

Moreover, providing the lightening portion 176g in the penetration plate 176 can reduce the weight of the battery terminal 101, and thus can facilitate the improvement in fuel economy of a vehicle in which the battery terminal 101 and the battery 150 are installed.

In the battery terminal 101 in the second embodiment, the pressing-force applying portion 177 includes the threaded hole 176b that is provided on the other end portion 176e of the penetration plate 176 as a fastening-member support portion and the fastening bolt 167 that is supported to be rotatable around the axial direction by the threaded hole 176b as a fastening member. The threaded hole 176b serves also as a fastened member that screws together with the fastening bolt 167. The pressing-force applying portion 177 further includes the first spacer 171 and the second spacer 162 as a pressing-force conversion member that is arranged in contact with the annular portions 124a and 125a from the end portion (the other end portion 176e) side of the penetration plate 176 on which the threaded hole 176b is provided and that converts the tightening force F3 in the axial direction that arises between the fastening bolt 167 and the threaded hole 176b along with the rotation of the fastening bolt 167 around the axial direction into the pressing force F4 in the long-side direction that presses the annular portions 124a and 125a in a direction of reducing the intervals of the slits 124d and 125d of the annular portions 124a and 125a out of the long-side direction (width direction).

With such a configuration, by the action of the first spacer 171 and the second spacer 162 as the pressing-force conversion member, the tightening force F3 in the axial direction that arises along with the rotation of the fastening bolt 167 around the axial direction is converted into the pressing force F4 in the long-side direction that reduces the intervals of the slits 124*d* and 125*d* of the annular portions 124*a* and 125*a*, and thereby the annular portions 124*a* and 125*a* can be fastened to the battery post 151. That is, by operating the fastening bolt 167 to rotate around the axial direction of the battery post 151, that is, around the vertical direction, the battery terminal 101 can be fastened to the battery post 151. Consequently, there is no need to secure a work space to set and rotate a tool for rotating the fastening bolt 167 from the lateral side of the battery post 151, that is, the lateral side of the battery 150, as in the conventional case, and thus the operation can be performed from above in the vertical direction of the battery 150, which is relatively easy to obtain the work space, for example. As in the foregoing, according to the battery terminal 101 in the second embodiment, the work space required in the periphery of the battery 150 when the battery terminal 101 is fastened to the battery post 151 can be reduced.

In the above-described second embodiment, the configuration has been exemplified in which the lightening portion 176*g* is provided in the penetration plate 176 so that the bent coupling portion 201 of the annular portions 124*a* and 125*a* is difficult to interfere with the penetration plate 176 when the intervals of the slits 124*d* and 125*d* are narrowed when the battery terminal 101 is fastened to the battery post 151. The lightening portion 176*g* may be of other shapes, such as an involute curve, a chamfer, and an R shape, as long as it is a recessed portion in which the size of the penetration plate 176 in the short-side direction reduces to the other longitudinal side end surface 176*i* side. Forming the lightening portion 176*g* in a recessed shape, such as an involute curve, a chamfer, and an R shape, narrows the intervals of the slits 124*d* and 125*d* when the battery terminal 101 is fastened to the battery post 151, and the plate-like projecting portions 124*e* and 125*e* of the annular portions 124*a* and 125*a* can be moved smoothly in the directions indicated by the arrows A in FIG. 10 even when a situation occurs in which the penetration plate 176 and the bent coupling portion 201 of the annular portions 124*a* and 125*a* come in contact with each other. Consequently, the plate-like projecting portions 124*e* and 125*e* of the annular portions 124*a* and 125*a* can be further facilitated continuing to deform so as to hold the battery post 151. The annular portions 124*a* and 125*a* can be fastened much more strongly to the battery post 151. The lightening portion 176*g* may be formed at least at the portion exposed from the slits 124*d* and 125*d* out of the longitudinal side end surface 176*h* of the penetration plate 176, in a state in which the penetration plate 176 penetrates through both ends of the annular portions 124*a* and 125*a*.

In the above-described second embodiment, the configuration has been exemplified that, by defining the fastened member that screws together with the fastening bolt 167 as the threaded hole 176*b* of the penetration plate 176, makes the tightening force F3 in the axial direction arise between the fastening bolt 167 and the penetration plate 176. However, the configuration may include a separate nut as the fastened member.

The fastening structure by the tightening portion 173 of the battery terminal 101 only needs to include the configuration in which, in a state in which at least the penetration plate 176 penetrates through both ends of the annular portions 124*a* and 125*a*, the annular portions 124*a* and 125*a* can be fastened to the battery post 151, and a configuration other than that of the above-described embodiment may be possible. In the same manner, the pressing-force applying portion 177 only needs to have the configuration that can apply the pressing force F4 to the annular portions 124*a* and 125*a*, and a configuration different from the configuration that includes the fastening bolt 167, the threaded hole 176*b*, the first spacer 171, and the second spacer 162 in the above-described embodiment may be possible.

In the battery terminal according to the present invention, annular portions can be fastened more strongly to a battery post by providing a recessed portion on a penetration plate. Consequently, the battery terminal has an effect of being capable of improving its fastening performance when fastened to the battery post.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery terminal comprising:
   an annular portion on which a post insertion hole to which a battery post is inserted and a slit that continues to the post insertion hole are formed;
   a penetration plate that is arranged to penetrate through from one end portion of the annular portion to another end portion of the annular portion interposing the slit along a width direction that is a direction orthogonal to an axial direction of the battery post and a direction of traversing the slit;
   a retaining portion that is provided on one end portion of the penetration plate and configured to prevent the penetration plate from coming off from the annular portion; and
   a pressing-force applying portion that is provided on another end portion of the penetration plate and configured to apply a pressing force in the width direction that presses the annular portion in a direction of reducing a width of the slit, wherein
   the penetration plate includes a pair of longitudinal side end surfaces that extends along the width direction and is arranged to face each other in a short-side direction orthogonal to the width direction and the axial direction, and includes, at least at a portion exposed from the slit on both sides of the pair of longitudinal side end surfaces in the short-side direction, a pair of recessed portions that are formed so as to reduce a size of the penetration plate in the short-side direction to another longitudinal side end surface side.

2. The battery terminal according to claim 1, wherein
   the annular portion is a pair of annular portions arranged to face each other along the axial direction,
   the pair of annular portions is coupled together by a bent coupling portion that extends in the axial direction at an end portion positioned at an outer edge of the slit, and
   the recessed portion is formed such that, when compared with a clearance between the one longitudinal side end surface of the penetration plate on which the recessed portion is provided and the bent coupling portion, a clearance between the recessed portion and the bent coupling portion is wider than a clearance between those other portions surrounding the recessed portion of the one longitudinal side end surface and the bent coupling portion.

3. The battery terminal according to claim 1, wherein
   the pressing-force applying portion includes
   a fastening-member support portion provided on the other end portion of the penetration plate, a fastening member supported to be rotatable around the axial direction by the fastening-member support portion, a fastened member that screws together with the fastening member, and a pressing-force conversion member that is arranged in contact with the annular portion from the other end portion side of the penetration plate, and converts a tightening force in the axial direction that arises between the fastening member and the fastened member along with rotation of the fastening member around the axial direction into a pressing force in the width direction that presses the annular portion in a direction of reducing a width of the slit.

4. The battery terminal according to claim 2, wherein the pressing-force applying portion includes a fastening-member support portion provided on the other end portion of the penetration plate, a fastening member supported to be rotatable around the axial direction by the fastening-member support portion, a fastened member that screws together with the fastening member, and a pressing-force conversion member that is arranged in contact with the annular portion from the other end portion side of the penetration plate, and converts a tightening force in the axial direction that arises between the fastening member and the fastened member along with rotation of the fastening member around the axial direction into a pressing force in the width direction that presses the annular portion in a direction of reducing a width of the slit.

5. The battery terminal according to claim 1, wherein the one longitudinal side end surface faces the annular portion in the short-side direction.

6. The battery terminal according to claim 1, wherein the one longitudinal side end surface faces the post insertion hole in the short-side direction.

7. The battery terminal according to claim 1, wherein the recessed portion is formed such that a clearance is formed between the one longitudinal side end surface faces and the annular portion in the short-side direction and the annular portion.

8. The battery terminal according to claim 1, wherein the one longitudinal side end surface that faces the annular portion and the post insertion hole in the short-side direction, and the recessed portion is disposed at the end portion of the penetration plate that is opposite, in a width direction, of the another end portion of the penetration plate that the pressing-force applying portion is provided.

* * * * *